US012602408B2

(12) United States Patent
Baeuml et al.

(10) Patent No.: US 12,602,408 B2
(45) Date of Patent: Apr. 14, 2026

(54) STREAMING OF NATURAL LANGUAGE (NL) BASED OUTPUT GENERATED USING A LARGE LANGUAGE MODEL (LLM) TO REDUCE LATENCY IN RENDERING THEREOF

(71) Applicant: GOOGLE LLC, Mountain View, CA (US)

(72) Inventors: Martin Baeuml, Wollerau (CH); Yanping Huang, Mountain View, CA (US); Wenhao Jia, Saratoga, CA (US); Chang Lan, Kirkland, WA (US); Yuanzhong Xu, Mountain View, CA (US); Junwhan Ahn, San Jose, CA (US); Alexander Bailey, Wollerau (CH); Leif Schelin, Zurich (CH); Trevor Strohman, Sunnyvale, CA (US); Emanuel Taropa, Los Altos, CA (US); Sidharth Mudgal, Mountain View, CA (US); Yanyan Zheng, Palo Alto, CA (US); Zhifeng Chen, Sunnyvale, CA (US); Ahmad Beirami, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 263 days.

(21) Appl. No.: 18/136,634

(22) Filed: Apr. 19, 2023

(65) Prior Publication Data

US 2024/0311402 A1     Sep. 19, 2024

Related U.S. Application Data

(60) Provisional application No. 63/451,859, filed on Mar. 13, 2023.

(51) Int. Cl.
G06F 16/332 (2025.01)
G06F 16/3329 (2025.01)
G06F 40/40 (2020.01)

(52) U.S. Cl.
CPC ...... *G06F 16/3322* (2019.01); *G06F 16/3329* (2019.01); *G06F 40/40* (2020.01)

(58) Field of Classification Search
CPC ..... G06F 16/332; G06F 16/3329; G06F 40/40
See application file for complete search history.

(56) References Cited

U.S. PATENT DOCUMENTS

2023/0053341 A1   2/2023   Konzelmann
2023/0074406 A1   3/2023   Baeuml
(Continued)

OTHER PUBLICATIONS

Priyanka, Perplexity of Language Models, 2022, Medium, whole document (Year: 2022).*

(Continued)

*Primary Examiner* — Sonia L Gay
(74) *Attorney, Agent, or Firm* — Gray Ice Higdon

(57) ABSTRACT

Implementations relate to reducing latency in generating and/or rendering natural language (NL) output generated using a large language model (LLM). Processor(s) of a system can: receive NL based input associated with a client device, and generate the NL based output utilizing the LLM. The NL based output can be a stream of NL based output in that it includes a plurality of segments, and is generated on a segment-by-segment basis. In some implementations, a first segment of the stream of NL based output is selected for inclusion in the stream of NL based output as a second segment (and any subsequent segment) is being generated to reduce latency in evaluating the NL based output as a whole prior to rendering thereof. In some versions of those implementations, the first segment is rendered as the second (Continued)

segment (and any subsequent segment) is being generated to further reduce latency in rendering thereof.

18 Claims, 8 Drawing Sheets

(56) References Cited

U.S. PATENT DOCUMENTS

| | | | |
|---|---|---|---|
| 2024/0256618 A1* | 8/2024 | Adada | G06F 16/9536 |
| 2024/0303423 A1* | 9/2024 | Fabian | G06F 40/18 |

OTHER PUBLICATIONS

Krishna, Rankgen: Improving Text Generation with Large Ranking Models, 2022, arXiv, whole document (Year: 2022).*

Lehmann, Suggestion Lists vs. Continuous Generation: Interaction Design for Writing with Generative Models on Mobile Devices Affect Text Length, Wording and Perceived Authorship, 2022, arXiv, whole document (Year: 2022).*
Yuan, Wordcraft: StoryWriting With Large Language Models, 2022, IUI, whole document (Year: 2022).*
European Patent Office; International Search Report and Written Opinion issued in Application No. PCT/US2023/028719; 13 pages; dated Oct. 11, 2023.
Khouzaim, H. et al., "An easy method to make dialogue systems incremental"; Proceedings of the 15th Annual Meeting of the Special Interest Group on Discourse and Dialogue; pp. 98-107; dated Jun. 18, 2014.
Beurer-Kellner, L. et al., "Prompting Is Programming: A Query language for Large Language Models"; arXiv.org., Cornell University; arXiv:2212.06094v1; 28 pages; dated Dec. 12, 2022.
Valvoda, J. et al., "Prompting for a conversation: How to control a dialog model?"; arXiv.org, Cornell University; arXiv:2209. 11068v1; 8 pages; dated Sep. 22, 2022.

* cited by examiner

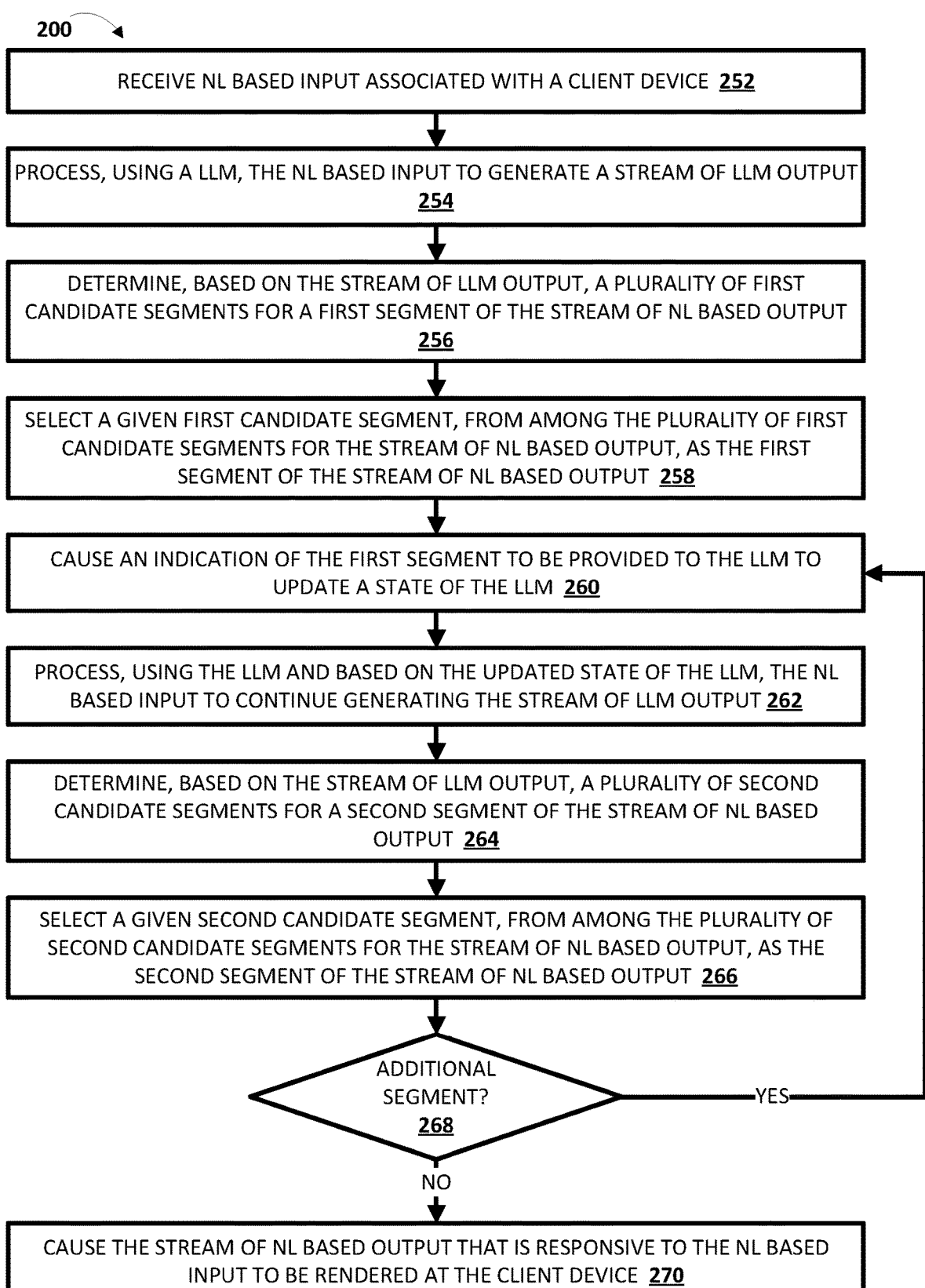

200

RECEIVE NL BASED INPUT ASSOCIATED WITH A CLIENT DEVICE 252

PROCESS, USING A LLM, THE NL BASED INPUT TO GENERATE A STREAM OF LLM OUTPUT 254

DETERMINE, BASED ON THE STREAM OF LLM OUTPUT, A PLURALITY OF FIRST CANDIDATE SEGMENTS FOR A FIRST SEGMENT OF THE STREAM OF NL BASED OUTPUT 256

SELECT A GIVEN FIRST CANDIDATE SEGMENT, FROM AMONG THE PLURALITY OF FIRST CANDIDATE SEGMENTS FOR THE STREAM OF NL BASED OUTPUT, AS THE FIRST SEGMENT OF THE STREAM OF NL BASED OUTPUT 258

CAUSE AN INDICATION OF THE FIRST SEGMENT TO BE PROVIDED TO THE LLM TO UPDATE A STATE OF THE LLM 260

PROCESS, USING THE LLM AND BASED ON THE UPDATED STATE OF THE LLM, THE NL BASED INPUT TO CONTINUE GENERATING THE STREAM OF LLM OUTPUT 262

DETERMINE, BASED ON THE STREAM OF LLM OUTPUT, A PLURALITY OF SECOND CANDIDATE SEGMENTS FOR A SECOND SEGMENT OF THE STREAM OF NL BASED OUTPUT 264

SELECT A GIVEN SECOND CANDIDATE SEGMENT, FROM AMONG THE PLURALITY OF SECOND CANDIDATE SEGMENTS FOR THE STREAM OF NL BASED OUTPUT, AS THE SECOND SEGMENT OF THE STREAM OF NL BASED OUTPUT 266

ADDITIONAL SEGMENT? 268

YES

NO

CAUSE THE STREAM OF NL BASED OUTPUT THAT IS RESPONSIVE TO THE NL BASED INPUT TO BE RENDERED AT THE CLIENT DEVICE 270

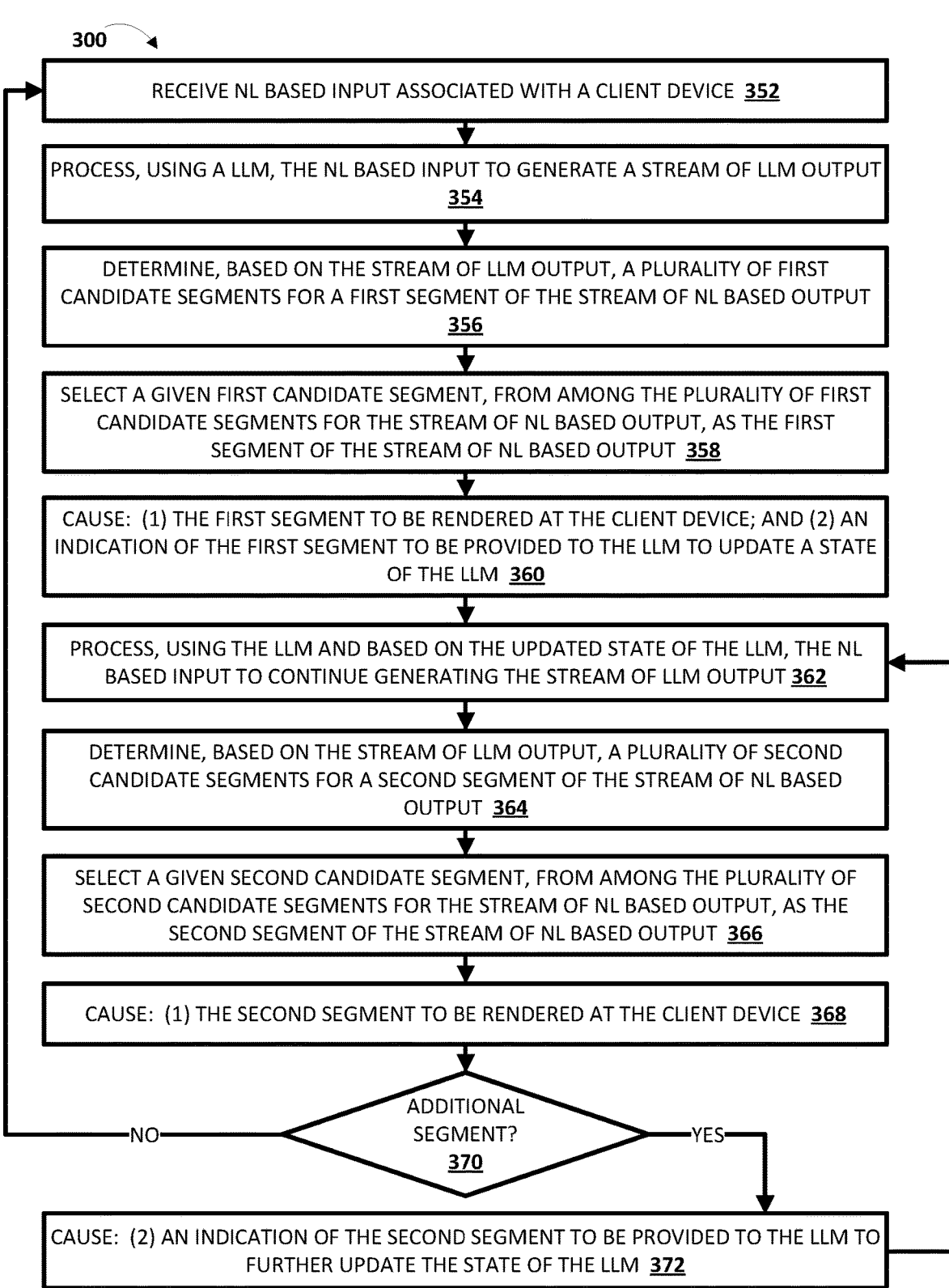

RECEIVE NL BASED INPUT ASSOCIATED WITH A CLIENT DEVICE 352

PROCESS, USING A LLM, THE NL BASED INPUT TO GENERATE A STREAM OF LLM OUTPUT 354

DETERMINE, BASED ON THE STREAM OF LLM OUTPUT, A PLURALITY OF FIRST CANDIDATE SEGMENTS FOR A FIRST SEGMENT OF THE STREAM OF NL BASED OUTPUT 356

SELECT A GIVEN FIRST CANDIDATE SEGMENT, FROM AMONG THE PLURALITY OF FIRST CANDIDATE SEGMENTS FOR THE STREAM OF NL BASED OUTPUT, AS THE FIRST SEGMENT OF THE STREAM OF NL BASED OUTPUT 358

CAUSE: (1) THE FIRST SEGMENT TO BE RENDERED AT THE CLIENT DEVICE; AND (2) AN INDICATION OF THE FIRST SEGMENT TO BE PROVIDED TO THE LLM TO UPDATE A STATE OF THE LLM 360

PROCESS, USING THE LLM AND BASED ON THE UPDATED STATE OF THE LLM, THE NL BASED INPUT TO CONTINUE GENERATING THE STREAM OF LLM OUTPUT 362

DETERMINE, BASED ON THE STREAM OF LLM OUTPUT, A PLURALITY OF SECOND CANDIDATE SEGMENTS FOR A SECOND SEGMENT OF THE STREAM OF NL BASED OUTPUT 364

SELECT A GIVEN SECOND CANDIDATE SEGMENT, FROM AMONG THE PLURALITY OF SECOND CANDIDATE SEGMENTS FOR THE STREAM OF NL BASED OUTPUT, AS THE SECOND SEGMENT OF THE STREAM OF NL BASED OUTPUT 366

CAUSE: (1) THE SECOND SEGMENT TO BE RENDERED AT THE CLIENT DEVICE 368

ADDITIONAL SEGMENT? 370

NO

YES

CAUSE: (2) AN INDICATION OF THE SECOND SEGMENT TO BE PROVIDED TO THE LLM TO FURTHER UPDATE THE STATE OF THE LLM 372

FIG. 3

400

```
┌─────────────────────────────────────────────────────────────────────────┐
│         RECEIVE NL BASED INPUT ASSOCIATED WITH A CLIENT DEVICE 452        │
└─────────────────────────────────────────────────────────────────────────┘
                                    │
                                    ▼
┌─────────────────────────────────────────────────────────────────────────┐
│     PROCESS, USING A LLM, THE NL BASED INPUT TO GENERATE LLM OUTPUT 454   │
└─────────────────────────────────────────────────────────────────────────┘
                                    │
                                    ▼
┌─────────────────────────────────────────────────────────────────────────┐
│    DETERMINE, BASED ON THE LLM OUTPUT, A PLURALITY OF FIRST CANDIDATE     │
│   SEGMENTS FOR A FIRST SEGMENT OF THE STREAM OF NL BASED OUTPUT 456       │
└─────────────────────────────────────────────────────────────────────────┘
                                    │
                                    ▼
┌─────────────────────────────────────────────────────────────────────────┐
│  SELECT A GIVEN FIRST CANDIDATE SEGMENT, FROM AMONG THE PLURALITY OF FIRST│
│   CANDIDATE SEGMENTS FOR THE STREAM OF NL BASED OUTPUT, AS THE FIRST      │
│            SEGMENT OF THE STREAM OF NL BASED OUTPUT 458                    │
└─────────────────────────────────────────────────────────────────────────┘
                                    │
                                    ▼
┌─────────────────────────────────────────────────────────────────────────┐
│ PROCESS, USING THE LLM AND BASED ON THE FIRST SEGMENT, THE NL BASED INPUT TO│◄──┐
│            GENERATE ADDITIONAL LLM OUTPUT 460                             │   │
└─────────────────────────────────────────────────────────────────────────┘   │
                                    │                                          │
                                    ▼                                          │
┌─────────────────────────────────────────────────────────────────────────┐   │
│   DETERMINE, BASED ON THE ADDITIONAL LLM OUTPUT, A PLURALITY OF SECOND    │   │
│   CANDIDATE SEGMENTS FOR A SECOND SEGMENT OF THE STREAM OF NL BASED       │   │
│                        OUTPUT 462                                         │   │
└─────────────────────────────────────────────────────────────────────────┘   │
                                    │                                          │
                                    ▼                                          │
┌─────────────────────────────────────────────────────────────────────────┐   │
│  SELECT A GIVEN SECOND CANDIDATE SEGMENT, FROM AMONG THE PLURALITY OF     │   │
│  SECOND CANDIDATE SEGMENTS FOR THE STREAM OF NL BASED OUTPUT, AS THE      │   │
│         SECOND SEGMENT OF THE STREAM OF NL BASED OUTPUT 464               │   │
└─────────────────────────────────────────────────────────────────────────┘   │
                                    │                                          │
                                    ▼                                          │
                          ╱─────────────────╲                                 │
                         ╱   ADDITIONAL       ╲                                │
                        ╱    SEGMENT?          ╲────────────YES────────────────┘
                        ╲      466             ╱
                         ╲                    ╱
                          ╲─────────────────╱
                                    │
                                   NO
                                    ▼
┌─────────────────────────────────────────────────────────────────────────┐
│  CAUSE THE STREAM OF NL BASED OUTPUT THAT IS RESPONSIVE TO THE NL BASED   │
│       INPUT TO BE RENDERED AT THE CLIENT DEVICE 468                       │
└─────────────────────────────────────────────────────────────────────────┘
```

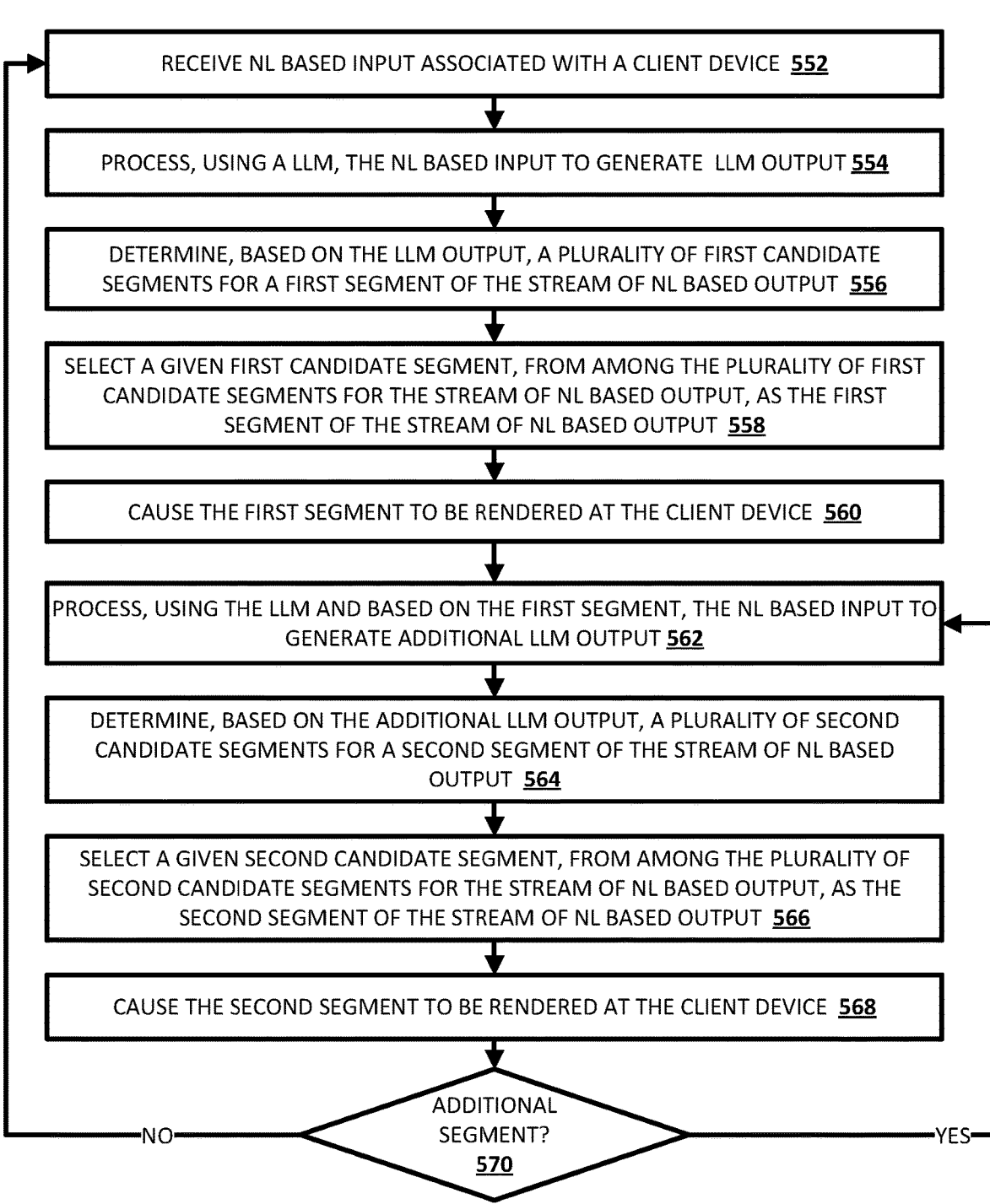

RECEIVE NL BASED INPUT ASSOCIATED WITH A CLIENT DEVICE 552

PROCESS, USING A LLM, THE NL BASED INPUT TO GENERATE LLM OUTPUT 554

DETERMINE, BASED ON THE LLM OUTPUT, A PLURALITY OF FIRST CANDIDATE SEGMENTS FOR A FIRST SEGMENT OF THE STREAM OF NL BASED OUTPUT 556

SELECT A GIVEN FIRST CANDIDATE SEGMENT, FROM AMONG THE PLURALITY OF FIRST CANDIDATE SEGMENTS FOR THE STREAM OF NL BASED OUTPUT, AS THE FIRST SEGMENT OF THE STREAM OF NL BASED OUTPUT 558

CAUSE THE FIRST SEGMENT TO BE RENDERED AT THE CLIENT DEVICE 560

PROCESS, USING THE LLM AND BASED ON THE FIRST SEGMENT, THE NL BASED INPUT TO GENERATE ADDITIONAL LLM OUTPUT 562

DETERMINE, BASED ON THE ADDITIONAL LLM OUTPUT, A PLURALITY OF SECOND CANDIDATE SEGMENTS FOR A SECOND SEGMENT OF THE STREAM OF NL BASED OUTPUT 564

SELECT A GIVEN SECOND CANDIDATE SEGMENT, FROM AMONG THE PLURALITY OF SECOND CANDIDATE SEGMENTS FOR THE STREAM OF NL BASED OUTPUT, AS THE SECOND SEGMENT OF THE STREAM OF NL BASED OUTPUT 566

CAUSE THE SECOND SEGMENT TO BE RENDERED AT THE CLIENT DEVICE 568

ADDITIONAL SEGMENT? 570

NO    YES

FIG. 5

STREAMING OF NATURAL LANGUAGE (NL) BASED OUTPUT GENERATED USING A LARGE LANGUAGE MODEL (LLM) TO REDUCE LATENCY IN RENDERING THEREOF

BACKGROUND

Large language models (LLMs) are particular types of machine learning models that can perform various natural language processing (NLP) tasks, such as language generation, machine translation, and question-answering. These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a natural language (NL) based input that is received from a client device, and generate a NL based output that is responsive to the NL based input and that is to be rendered at the client device. However, in generating the NL based output utilizing these LLMs, additional latency is introduced that may not be present absent utilizing these LLMs. This additional latency can prolong user interactions with these LLMs and detract from a user experience with these LLMs. Accordingly, there is a need in the art for reducing latency in utilizing these LLMs.

SUMMARY

Implementations described herein relate to reducing latency in generating and/or rendering natural language (NL) output generated using a large language model (LLM). For example, processor(s) of a system can: receive NL based input associated with a client device, and generate the NL based output utilizing the LLM. The NL based output can be a stream of NL based output in that it includes a plurality of segments, and is generated on a segment-by-segment basis (e.g., chunked decoding). In some implementations, the system selects a first segment of the stream of NL based output for inclusion in the stream of NL based output as a second segment (and any subsequent segment) is being generated to reduce latency in evaluating the NL based output as a whole prior to rendering thereof. In some versions of those implementations, the system causes the first segment to be rendered at the client device as the second segment (and any subsequent segment) is being generated to further reduce latency in rendering thereof. The processor(s) of the system can be implemented locally at the client device or remotely from the client device (e.g., at remote server(s) that are communicatively coupled to the client device).

In some implementations, and in generating the stream of NL based output, the system can process, using a LLM, the NL based input to generate a stream of LLM output. The stream of LLM output can include, for example, a probability distribution over a sequence of words or phrases that are predicted to be responsive to the NL based input. Further, the LLM output can be considered a stream of LLM output in that, as each word or phrase of the NL based input is being processed using the LLM, the probability distribution over the sequence of words or phrases that are predicted to be responsive to the NL based input can be continuously updated and with respect any previously selected segments for a stream of NL based output. Further, the system can determine, based on the stream of LLM output, a plurality of first candidate segments for the first segment of the stream of LLM output, and select, based on one or more ranking criteria, the first segment for inclusion in the stream of NL based output. Moreover, the system can update a state of the LLM based on the first segment that is selected for inclusion in the stream of NL based output. In these implementations, as each of the segments are selected for inclusion in the stream of NL based output, the segments may not be rendered at the client device until the stream of NL based output is complete. Nonetheless, as each of the segments are selected for inclusion in the stream of NL based output, the system can cause the client device to pre-fetch each of the segments for subsequent rendering thereof (e.g., via an API server).

By updating the state of the LLM in these implementations, the LLM can utilize the first segment as a prefix in further processing of the NL based input, which can constrain a search space over the probability distribution in determining, based on the stream of LLM output, a plurality of second candidate segments for the second segment of the stream of LLM output, and selecting, based on one or more of the ranking criteria, the second segment for inclusion in the stream of NL based output. Further, by selecting each of the segments for inclusion in the stream of NL based output on the segment-by-segment basis as the NL based input continues to be processed by the LLM, the system need not select the entire NL based output upon completion of the processing of the NL based input, thereby reducing latency in causing the NL based output to be rendered at the client device.

As noted above, in these implementations, the stream of NL based output may not be rendered at the client device until the stream of NL based output is complete. For instance, in various implementations, the stream of NL based output that is initially generated may not be suitable for rendering at the client device due to assurance reasons, accuracy reasons, quality reasons, coherency reasons, and/or other reasons. Accordingly, in some versions of these implementations, the system can re-select one or more alternative segments for inclusion in the stream of NL based output, or re-process the NL based input entirely to generate an alternative stream of NL based output (e.g., by modifying parameter(s) of the LLM, such as a temperature parameter).

Nonetheless, in additional or alternative implementations, each of the segments can be rendered at the client device as they are selected for inclusion in the stream of NL based output and in a streaming manner. For example, in response to the first segment being selected for inclusion in the stream of NL based output, not only is the first segment pre-fetched by the client device, but the first segment is also rendered at the client device. Notably, the first segment can be rendered at the client device while the system is still processing the NL based input and selecting the second segment. By causing each of the segments to be rendered in the streaming manner in these implementations, the system causes one or more (e.g., all) of the segments that form the stream of NL based output to be rendered prior to completion of processing of the NL based input, thereby further reducing latency in causing the NL based output to be rendered at the client device.

In implementations where each of the segments are rendered at the client device as they are selected for inclusion in the stream of NL based output, the system can further cause a halt streaming selectable element to be rendered at the client device and along with the stream of NL based output. The halt streaming selectable element, when selected, can cause the system to halt processing of the NL based input and/or halt rendering of a current segment of the stream of NL based output that is being rendered when the halt streaming selectable element is selected (e.g., halt rendering of the first segment, the second segment, or any other segment that is being rendered when the selection is received). For instance, if the user realizes that the NL based input did not result in the stream of NL based output that the user desired when initially providing the NL based input, then the user can select the halt streaming selectable element to halt any further processing and/or rendering. This enables the user to refine the NL based input to cause an additional stream of NL based output that the user desired t be rendered. By providing the halt streaming selectable element in these implementations, the system can cause the human-to-computer dialog to be concluded in a more quick and efficient manner.

Although the above implementations are described with respect to the LLM output being the stream of LLM output (e.g., where the probability distribution over the sequence of words or phrases that are predicted to be responsive to the NL based input is continuously updated), it should be understood that is not meant to be limiting. For example, in additional or alternative implementations, any previously selected segments can be utilized as context in re-processing the NL based input along with the context. In these implementations, the context can effectively cause any subsequent segments to be determined with respect to the previously selected segments. However, in these implementations, the probability distribution over the sequence of words or phrases that are predicted to be responsive to the NL based input may not be continuously updated. Rather, in these implementations, corresponding additional probability distribution over the sequence of words or phrases that are predicted to be responsive to the NL based input may be generated, and the subsequent segments selected in the same or similar manner as described above.

The above description is provided as an overview of some implementations of the present disclosure. Further description of those implementations, and other implementations, are described in more detail below.

BRIEF DESCRIPTION OF THE DRAWINGS

FIG. 2 depicts a flowchart illustrating an example method of generating a stream of natural language (NL) based output on a segment-by-segment basis to reduce latency in causing the stream of NL based output to be rendered, in accordance with various implementations.

FIG. 3 depicts a flowchart illustrating another example method of generating a stream of natural language (NL) based output on a segment-by-segment basis to reduce latency in causing the stream of NL based output to be rendered, in accordance with various implementations.

FIG. 4 depicts a flowchart illustrating yet another example method of generating a stream of natural language (NL) based output on a segment-by-segment basis to reduce latency in causing the stream of NL based output to be rendered, in accordance with various implementations.

FIG. 5 depicts a flowchart illustrating yet another example method of generating a stream of natural language (NL) based output on a segment-by-segment basis to reduce latency in causing the stream of NL based output to be rendered, in accordance with various implementations.

DETAILED DESCRIPTION OF THE DRAWINGS

Figure 1:
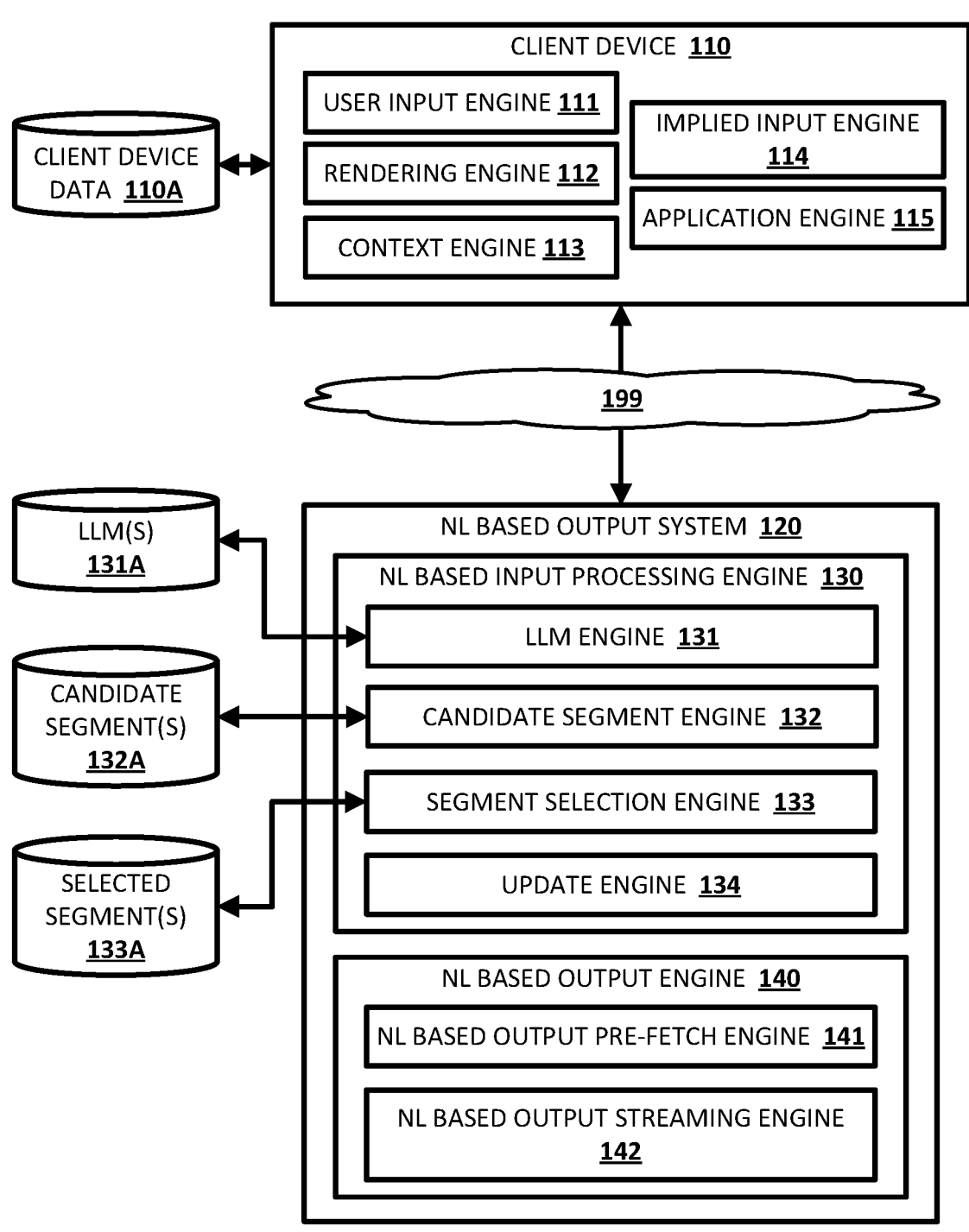
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a natural language (NL) based output system 120. In some implementations, all or aspects of the NL based output system 120 can be implemented locally at the client device 110. In additional or alternative implementations, all or aspects of the NL based output system 120 can be implemented remotely from the client device 110 as depicted in FIG. 1 (e.g., at remote server(s)). In those implementations, the client device 110 and the NL based output system 120 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which NL based input can be submitted and/or NL based output and/or other output to the NL based input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser installed on top of the operating system of the client device 110, or the web browser can be a software application that is integrated as part of the operating system of the client device 110. The application engine 115 (and the one or more software applications executed by the application engine 115) can interact with the NL based output system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch input directed to the client device 110.

Some instances of a NL based input described herein can be a query for a NL response that is formulated based on user input provided by a user of the client device 110 and detected via user input engine 111. For example, the query can be a typed query that is typed via a physical or virtual keyboard, a suggested query that is selected via a touch screen or a mouse of the client device 110, a spoken voice query that is detected via microphone(s) of the client device 110 (and optionally directed to an automated assistant executing at least in part at the client device 110), or an image or video query that is based on vision data captured by vision component(s) of the client device 110 (or based on NL input generated base on processing the image using, for example, object detection model(s), captioning model(s), etc.). Other instances of a NL based input described herein can be a prompt for NL content that is formulated based on user input provided by a user of the client device 110 and detected via the user input engine 111. For example, the prompt can be a typed prompt that is typed via a physical or virtual keyboard, a suggested prompt that is selected via a touch screen or a mouse of the client device 110, a spoken prompt that is detected via microphone(s) of the client device 110, or an image prompt that is based on an image captured by a vision component of the client device 110.

In various implementations, the client device 110 can include a rendering engine 112 that is configured to provide content (e.g., NL based output, an indication of source(s) associated with the NL based output, and/or other content) for audible and/or visual presentation to a user of the client device 110 using one or more user interface output devices. For example, the client device 110 can be equipped with one or more speakers that enable the content to be provided for audible presentation to the user via the client device 110. Additionally, or alternatively, the client device 110 can be equipped with a display or projector that enables the content to be provided for visual presentation to the user via the client device 110.

In various implementations, the client device 110 can include a context engine 113 that is configured to determine a context (e.g., current or recent context) of the client device 110 and/or of a user of the client device 110 (e.g., an active user of the client device 110 when the client device 110 is associated with multiple users). In some of those implementations, the context engine 113 can determine a context based on data stored in client device data database 110A. The data stored in the client device data database 110A can include, for example, user interaction data that characterizes current or recent interaction(s) of the client device 110 and/or a user of the client device 110, location data that characterizes a current or recent location(s) of the client device 110 and/or a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113 via the client device data database 110A or otherwise.

For example, the context engine 113 can determine a current context based on a current state of a dialog session (e.g., considering one or more recent inputs provided by a user during the dialog session), profile data, and/or a current location of the client device 110. For instance, the context engine 113 can determine a current context of "visitor looking for upcoming events in Louisville, Kentucky" based on a recently issued query, profile data, and an anticipated future location of the client device 110 (e.g., based on recently booked hotel accommodations). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting NL based input that is formulated based on user input, in generating an implied NL based input (e.g., an implied query or prompt formulated independent of any explicit NL based input provided by a user of the client device 110), and/or in determining to submit an implied NL based input and/or to render result(s) (e.g., an NL based output) for an implied NL based input.

In various implementations, the client device 110 can include an implied input engine 114 that is configured to: generate an implied NL based input independent of any user explicit NL based input provided by a user of the client device 110; submit an implied NL based input, optionally independent of any user explicit NL based input that requests submission of the implied NL based input; and/or cause rendering of search result(s) or a NL based output for the implied NL based input, optionally independent of any explicit NL based input that requests rendering of the search result(s) or the NL based output. For example, the implied input engine 114 can use one or more past or current contexts, from the context engine 113, in generating an implied NL based input, determining to submit the implied NL based input, and/or in determining to cause rendering of search result(s) or a NL based output that is responsive to the implied NL based input. For instance, the implied input engine 114 can automatically generate and automatically submit an implied query or implied prompt based on the one or more past or current contexts. Further, the implied input engine 114 can automatically push the search result(s) or the NL based output that is generated responsive to the implied query or implied prompt to cause them to be automatically rendered or can automatically push a notification of the search result(s) or the NL based output, such as a selectable notification that, when selected, causes rendering of the search result(s) or the NL based output. Additionally, or alternatively, the implied input engine 114 can submit respective implied NL based input at regular or non-regular intervals, and cause respective search result(s) or respective NL based outputs to be automatically provided (or a notification thereof automatically provided). For instance, the implied NL based input can be "patent news" based on the one or more past or current contexts indicating a user's general interest in patents, the implied NL based input or a variation thereof periodically submitted, and the respective search result(s) or the respective NL based outputs can be automatically provided (or a notification thereof automatically provided). It is noted that the respective search result(s) or the respective NL based output can vary over time in view of, e.g., presence of new/fresh search result document(s) over time.

Further, the client device 110 and/or the NL based output system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The NL based output system 120 is illustrated in FIG. 1 as including a NL based input processing engine 130 and a NL based output engine 140. Some of these engines can be combined and/or omitted in various implementations. Further, these engines can include various sub-engines. For instance, the NL based input processing engine 130 is illustrated in FIG. 1 as including a LLM engine 131, a candidate segment engine 132, a segment selection engine 133, and an update engine 134. Further, the NL based output engine 140 is illustrated in FIG. 1 as including a NL based output pre-fetch engine 141 and a NL based output streaming engine 142. Similarly, some of these sub-engines can be combined and/or omitted in various implementations. For instance, the NL based output pre-fetch engine 141 and the NL based output streaming engine 142 can be combined, the LLM engine 131 and the candidate segment engine 132 can be combined, the LLM engine 131 and the update engine 134 can be combined. Accordingly, it should be understood that the various engines and sub-engines of the NL based output system 120 illustrated in FIG. 1 are depicted for the sake of describing certain functionalities and is not meant to be limiting.

Further, the NL based output system 120 is illustrated in FIG. 1 as interfacing with various databases, such as a LLM database 131A, candidate segment(s) database 132A, and a selected segment(s) database 133A. Although particular engines and/or sub-engines are depicted as having access to particular databases, it should be understood that is for the sake of example and is not meant to be limiting. For instance, in some implementations, each of the various engines and/or sub-engines of the NL based output system 120 may have access to each of the various databases.

As described in more detail herein (e.g., with respect to FIGS. 2-5), the NL based output system 120 can be utilized to generate a stream of NL based output that is responsive to NL based input and based on processing the NL based input using LLM(s) by executing chunked decoding techniques. The stream of NL based output can include a plurality of segments and can be generated on a segment-by-segment basis. In some implementations, each of the segments can be pre-fetched by the client device 110 as they are selected for inclusion in the stream of NL based output, but withheld from being rendered until the entire stream of the NL based output is complete (e.g., as described with respect to FIGS. 2 and 3). By pre-fetching each of the segments as they are selected for inclusion in the stream of NL based output, latency in causing the stream of NL based output to be rendered at the client device 110 can be reduced. In additional or alternative implementation, each of the segments can be rendered in a streaming manner at the client device 110 as they are selected for inclusion in the stream of NL based output complete (e.g., as described with respect to FIGS. 4 and 5). By causing each of the segments to be rendered in the streaming manner at the client device 110 as they are selected for inclusion in the stream of NL based output, latency in causing the stream of NL based output to be rendered at the client device 110 can also be reduced. Additional description of the various engines and/or sub-engines of the NL based output system 120 is provided herein with respect to FIGS. 2-5.

Turning now to FIG. 2, a flowchart illustrating an example method 200 of generating a stream of natural language (NL) based output on a segment-by-segment basis to reduce latency in causing the stream of NL based output to be rendered is depicted. For convenience, the operations of the method 200 are described with reference to a system that performs the operations. This system of the method 200 includes one or more processors, memory, and/or other component(s) of computing device(s) (e.g., client device 110 of FIGS. 1, 6A, and 6B, NL based output system 120 of FIG. 1, computing device 710 of FIG. 7, one or more servers, and/or other computing devices). Moreover, while operations of the method 200 are shown in a particular order, this is not meant to be limiting. One or more operations may be reordered, omitted, and/or added.

At block 252, the system receives NL based input associated with a client device. In some implementations, the NL based input can be one formulated based on explicit user interface input at a client device (e.g., detected via the user input engine 111), such as typed input, voice input, input to cause an image to be captured or selected, etc. In some of those implementations, the NL based input can be a query. The query can be, for example, a voice query, a typed query, an image-based query, or a multimodal query (e.g., that includes voice input, and an image or video). In some implementations, when the query includes content that is not in textual format, the system can convert the query to a textual format or other format. For example, if the query is a voice query, then the system can perform automatic speech recognition (ASR) to convert the query to textual format. As another example, if the query is a multimodal query that includes an image or video of an avocado and a voice input of "is this healthy", then the system can perform ASR to convert the voice input to text form and can perform image or video processing on the image or video to recognize an avocado is present in the image or video, and can perform co-reference resolution to replace "this" with "an avocado", resulting in a textual format query of "is an avocado healthy".

In some implementations, the NL based input can be received in an application environment of one or more software applications that are accessible at the client device, such as a browser software application, an automated assistant software application, etc. (e.g., via the application engine 115). In additional or alternative versions of those implementations, the system can augment the NL based input (e.g., augment the explicit NL based input) with additional information, such as one or more past or current contexts of the client device and/or a user of the client device (e.g., via the context engine 113).

In other implementations, the NL based input can alternatively be implied NL based input, such as an inferred/parameterless query, such as one formulated and/or submitted independent of any explicit user NL based input directed to formulating the implied NL based input (e.g., as described with respect to the context engine 113 and/or the implied input engine 114 of FIG. 1). For example, the query can be an implied query that is automatically generated based on profile data and that is automatically submitted. For instance, the implied NL based input can be an implied query of "machine learning", based on profile data indicating interest in machine learning topic(s). As another example, the implied NL based input can be an implied query that is automatically generated and/or automatically submitted based on a current and/or recent context. As yet another example, the implied NL based input can be an implied query that is submitted based on the user providing some indication of a desire to perform a search (e.g., pushing a search button, performing a search touch gesture, accessing a particular screen or state of an application), but that is generated automatically based on content currently being displayed at a client device, location, time of day, and/or other context signal(s).

At block 254, the system processes, using a LLM, the NL based input to generate a stream of LLM output. For example, the system can cause the LLM engine 131 to process, using a LLM stored in the LLM(s) database 131A, the NL based input to generate the stream of LLM output. The LLM can include, for example, any LLM that is stored in the LLM(s) database 131A, such as PaLM, BERT, LaMDA, Meena, GPT-3, GPT-4, ChatGPT, and/or any other LLM, such as any other LLM that is encoder-only based, decoder-only based, sequence-to-sequence based and that optionally includes an attention mechanism or other memory. Further, the stream of LLM output can include, for example, a probability distribution over a sequence of words or phrases that are predicted to be responsive to the NL based input. Notably, the LLM can include billions of weights and/or parameters that are learned through training the LLM on enormous amounts of diverse data. This enables the LLM to generate the LLM output as the probability distribution over the sequence of words or phrases. In some implementations, the sequence of words or phrases corresponds to a vocabulary. In some versions of these implementations, the vocabulary can optionally be restricted to that of a particular persona or a particular domain. This enables the LLM to reflect the particular persona or appear well-versed in the particular domain. As described herein, the LLM output can be considered a stream in various implementations in that, as each word or phrase of the NL based input is being processed using the LLM, the probability distribution over the sequence of words or phrases that are predicted to be responsive to the NL based input can be continuously updated and with respect any previously selected segments for a stream of NL based output.

At block 256, the system determines, based on the stream of LLM output, a plurality of first candidate segments for a first segment of the stream of NL based output. For example, the system can cause the candidate segment engine 132 to determine, based on the probability distribution over the sequence of words or phrases, the plurality of first candidate segments for the first segment of the stream of NL based input. The candidate segment engine 132 can utilize matrix multiplication using the weights and/or parameters of the LLM to determine the plurality of first candidate segments. In some implementations, the plurality of first candidate segments can include a fixed number of candidate segments.

For instance, the fixed number of candidate can include the two most likely candidates including words or phrases that are predicted to be responsive to the NL based input for the first segment and based on the probability distribution for the words or phrases, the 10 most likely candidates including words or phrases that are predicted to be responsive to the NL based input for the first segment and based on the probability distribution for the words or phrases, the 16 most likely candidates including words or phrases that are predicted to be responsive to the NL based input for the first segment and based on the probability distribution for the words or phrases, and/or any other fixed number of candidate segments. In other implementations, the plurality of first candidate segments may include a fixed number of candidate segments. Rather, in these implementations, the plurality of first candidate segments can include any number of candidate segments corresponding to words or phrases that are associated with one or more probabilities from the probability distribution over the sequence of words or phrases that satisfy a threshold probability.

In some implementations, each of the plurality of first candidate segments can include a fixed number of words or phrases. For instance, each of the plurality of first candidate segments can include a single word, three words, five words, and/or any other fixed number or words or phrases. In other implementations, each of the plurality of first candidate segments can include a relative fixed number of words or phrases. For instance, each of the plurality of first candidate segments can include a corresponding sentence, but each corresponding sentence can be of varying length. Also, for instance, each of the plurality of first candidate segments can include words or phrases up to a corresponding punctuation mark, such as a corresponding period, a corresponding comma, a corresponding dash, or the like.

At block 258, the system selects a given first candidate segment, from among the plurality of first candidate segments for the stream of NL based output, as the first segment of the stream of NL based output. For example, the system can cause the segment selection engine 133 to select, based on one or more ranking criteria, the first segment for inclusion in the stream of NL based output and from among the plurality of first candidate segments for the stream of NL based output. Put another way, the system selection engine 133 can be a critic network or classifier that runs in parallel with the LLM analyzes the plurality of first candidate segments and selects the first segment for inclusion in the stream of NL based output based and based on the one or more ranking criteria while the system continues to process the NL based input (e.g., chunked decoding). The system can optionally store the first segment in one or more databases (e.g., the selected segment(s) database 133A). Notably, the first segment of the steam of NL based output is one of a plurality of segments that form the NL based output. Further, the NL based output can be considered a stream of NL based output in that it is generated on a segment-by-segment basis.

In various implementations, the one or more ranking criteria utilized in selecting the given first candidate segment as the first segment of the stream of NL based output can include an assurance criterion, an accuracy criterion, a quality criterion, and/or any other criteria. The assurance criterion can, for example, reflect a level of assurance or safety associated with each of the plurality of first candidate segments. Put another way, the assurance criterion for each of the plurality of first candidate segments can reflect a corresponding level of assurance for a user of the client device from which the NL based input was received if the corresponding first candidate segment was subsequently rendered at the client device. Further the accuracy criterion can, for example, reflect a level of accuracy or trustworthiness associated with each of the plurality of first candidate segments in instances where the first candidate segments include factual information. Moreover, the quality criterion can, for example, reflect a corresponding quality score associated with each of the plurality of first candidate segments. Although particular ranking criteria are described herein, it should be understood that these ranking criteria are provided for the sake of example and that any other suitable ranking criteria can be utilized.

At block 260, the system causes an indication of the first segment to be provided to the LLM to update a state of the LLM. At block 262, the system processes, using the LLM and based on the updated state of the LLM, the NL based input to continue generating the stream of the LLM output. At block 264, the system determines, based on the stream of LLM output, a plurality of second candidate segments for a second segment of the stream of NL based output. At block 266, the system selects a given second candidate segment, from among the plurality of second candidate segments for the stream of NL based output, as the second segment of the stream of NL based output. The system can optionally store the segment in one or more databases (e.g., the selected segment(s) database 133A). For example, the system can cause the update engine 134 to update the state of the LLM and based on the first segment that was selected at block 258. Further, the system can cause the LLM engine 131 to continue processing, using the LLM stored in the LLM(s) database 131A, the NL based input to generate the stream of LLM output and with respect to the first segment that was selected for inclusion in the stream of NL based output. Moreover, the system can cause the candidate segment engine 132 to determine, based on the updated probability distribution over the sequence of words or phrases, the plurality of second candidate segments for the second segment of the stream of NL based input. Furthermore, the system can cause the segment selection engine 133 to select, based on one or more of the ranking criteria noted above, the second segment for inclusion in the stream of NL based output and from among the plurality of second candidate segments for the stream of NL based output. Notably, in the method 200 of FIG. 2, the system can cause the LLM engine 131 to continue processing the NL based input while the first segment is being selected.

For example, the system can utilize the first segment that was selected for inclusion in the stream of NL based output as a prefix in subsequently determining the plurality of second candidate segments for subsequent segments of the stream of NL based output. Put another way, by using the first segment as the prefix in subsequently determining the plurality of second candidate segments, the probability distribution over the sequence of words or phrases corresponding to the stream of LLM output is effectively updated to indicate that word(s) and/or phrase(s) captured in the first segment has already been selected for inclusion in the stream of NL based output. Accordingly, one or more of the plurality of second segment candidates (e.g., one or all of the plurality of second segment candidates) that are determined by the candidate segment engine 132 can be determined in the same or similar manner described above with respect to block 256, but with respect to the first segment that was selected for inclusion in the stream of NL based output. Further, a given second candidate segment can be selected as the second segment (e.g., that follows the first segment in the stream of NL based output) by the segment selection engine 133 based on one or more of the ranking criteria. However, in selecting the second segment, the segment selection engine 133 can also consider a coherency criterion. The coherency criterion can, for example, reflect a coherency of each of the second candidate segments with respect to the first segment that was already selected for inclusion in the NL based output.

Also, for example, another way to consider how the plurality of second candidate segments are determined with respect to the first segment that was selected for inclusion in the stream of NL based output is to consider the stream of LLM output at various time instances. For instance, assume that the plurality of first candidate segments for the first segment of the stream of NL based output are determined at block 256 at a first time instance of a plurality of time instances, and that the first segment is selected at block 258 immediately subsequent to the first time instance. The state of the LLM is then updated to reflect the first segment that was selected. Further assume that the plurality of second candidate segments for the second segment of the stream of NL based output are determined at block 264 at a second time instance of the plurality of time instances and that is subsequent to the first time instance, and that the segment segment is selected at block 266 immediately subsequent to the second time instance. In this instance, the state of the LLM can be updated between the first time instance and the second time instance. Accordingly, the plurality of second candidate segments for the second segment of the stream of NL based output are determined at block 264 at the second time instance and/or are selected at block 266 immediately subsequent to the second time instance with the system knowing that the first segment was selected and without halting any processing of the NL based input by the LLM. Put another way, the system is always one time instance behind in determining subsequent candidate segments and/ or selecting a given subsequent candidate segment as a subsequent segment, and with respect to selecting a prior candidate segment as a prior segment.

At block 268, the system determines whether to include an additional segment in the stream of NL based output. The system can determine whether to include an additional segment in the stream of NL based on, for example, whether the stream of NL based output is complete. The system can determine whether the stream of NL based output is complete based on, for example, whether the LLM has completed processing of the NL based input, whether a current state of the stream of NL based output is determined to be responsive to the NL based input, and/or based on other considerations.

If, at an iteration of block 268, the system determines to include an additional segment in the stream of NL based output, then the system returns to block 260 and continues with the method 200, but with respect to both the first segment and the second segment that have already been selected for inclusion in the stream of NL based output. For example, at a subsequent iteration of block 260, the system can cause the update engine 134 to further update the state of the LLM and based on the second segment that was selected at block 266. Further, at a subsequent iteration of block 262, the system can cause the LLM engine 131 to continue processing, using the LLM stored in the LLM(s) database 131A, the NL based input to generate the stream of LLM output and with respect to both the first segment was selected for inclusion in the stream of NL based output and the second segment that was selected for inclusion in the stream of NL based output. Moreover, at a subsequent iteration of block 264, the system can cause the candidate segment engine 132 to determine, based on a further updated probability distribution over the sequence of words or phrases (e.g., further updated based the indication of the second segment at the subsequent iteration of block 260), a plurality of third candidate segments for a third segment of the stream of NL based input. Furthermore, at a subsequent iteration of block 266, the system can cause the segment selection engine 133 to select, based on one or more of the ranking criteria noted above, the third segment for inclusion in the stream of NL based output and from among the plurality of third candidate segments for the stream of NL based output. The method can continue in this manner until it is determined to not include any additional segments in the stream of NL based output at a subsequent iteration of block 268.

If, at an iteration of block 268, the system determines not to include any additional segment in the stream of NL based output, then the system proceeds to block 270. At block 270, the system causes the stream of NL based output that is responsive to the NL based input to be rendered at the client device. For example, as each of the segments are selected, the system can cause the NL based output pre-fetch engine 141 to transmit an indication to the client device that a segment to be included in the NL based output has been selected (e.g., via an API server). This enables the client device to pre-fetch each of the segments as they are selected by the system for inclusion in the stream of NL based output. Alternatively, as each of the segments are selected, the system can transmit each of the segments as they are selected by the system for inclusion in the stream of NL based output and to the client device. Notably, in implementations of the method 200, the stream of NL based output may not be rendered at the client device until the stream of NL based output is complete. Nonetheless, by enabling the client device to pre-fetch each of the segments as they are selected by the system for inclusion in the stream of NL based output, latency in causing the stream of NL based output to be rendered at the client device can be reduced.

In some implementations, the stream of NL based output can be visually rendered via a display of the client device (e.g., via the rendering engine 112). For example, textual data corresponding to the stream of NL based output can be transmitted to the client device for visual rendering via the display of the client device. In some versions of those implementations, the textual data corresponding to the stream of NL based output can be rendered in a streaming manner, such as on a character-by-character basis, a word-by-word basis, a segment-by-segment basis, and/or or in other streaming manners. In additional or alternative implementations, the NL based output can audibly rendered via speaker(s) of the client device (e.g., via the rendering engine 112). In some versions of these implementations, textual data corresponding to the NL based output can be transmitted to the client device and the client device can process, using text-to-speech model(s), synthesized speech audio data to generate synthesized speech capturing the textual data corresponding to the stream of NL based output. The synthesized audio data can be audibly rendered via the speaker(s) of the client device. In other versions of those implementations, the synthesized speech audio data can be generated remotely from the client device (e.g., at a remote server in implementations where the system is hosted at the remote server), and the synthesized speech audio data can be transmitted to the client device and audibly rendered via the speaker(s) of the client device.

As noted above, in implementations of the method 200, the stream of NL based output may not be rendered at the client device until the stream of NL based output is complete. For instance, in various implementations, the stream of NL based output that is initially generated may not be suitable for rendering at the client device due to assurance reasons, accuracy reasons, quality reasons, coherency reasons, and/or other reasons. Accordingly, in some implementations, the system can store the candidate segments as they are determined in the candidate segment(s) database 132A, and optionally discard those that are not suitable for rendering at the client device (e.g., due to assurance reasons, accuracy reasons, quality reasons, coherency reasons, and/or other reasons). This enables the system to quickly and efficiently access previously determined candidate segments, and select given candidate segments to generate an additional stream of NL based input that is suitable for rendering at the client device. Alternatively, in other implementations, the system can generate an additional stream of NL based output by processing the NL based input using an additional iteration of the method 200. In these implementations, the system, and prior to generating the additional stream of NL based output, the system can modify one or more parameters of the LLM (e.g., by adjusting a temperature of the LLM, by biasing selection of given candidate segments, and/or by modifying other parameters of the LLM). However, it should be understood that the system can cause the stream of NL based output to be rendered at the client device as the stream of NL based output is being generated (e.g., as described with respect to FIGS. 3 and 5), and that the method 200 of FIG. 2 may be utilized for certain types of NL based inputs (e.g., politics, religion, and/or types of NL based inputs that can result in controversial NL based outputs to some users).

Turning now to FIG. 3, a flowchart illustrating another example method 300 of generating a stream of natural language (NL) based output on a segment-by-segment basis to reduce latency in causing the stream of NL based output to be rendered is depicted. For convenience, the operations of the method 300 are described with reference to a system that performs the operations. This system of the method 300 includes one or more processors, memory, and/or other component(s) of computing device(s) (e.g., client device 110 of FIGS. 1, 6A, and 6B, NL based output system 120 of FIG. 1, computing device 710 of FIG. 7, one or more servers, and/or other computing devices). Moreover, while operations of the method 300 are shown in a particular order, this is not meant to be limiting. One or more operations may be reordered, omitted, and/or added.

At block 352, the system receives NL based input associated with a client device. At block 354, the system processes, using a LLM, the NL based input to generate a stream of LLM output. At block 356, the system determines, based on the stream of LLM output, a plurality of first candidate segments for a first segment of the stream of NL based output. At block 358, the system selects a given first candidate segment, from among the plurality of first candidate segments for the stream of NL based output, as the first segment of the stream of NL based output. The operations of blocks 352-358 of the method 300 of FIG. 3 can be performed in the same or similar manner described above with respect to blocks 252-258 of the method 200 of FIG. 2, respectively.

At block 360, the system causes: (1) the first segment to be rendered at the client device; and (2) an indication of the first segment to be provided to the LLM to update the state of the LLM. For example, the system can cause the update engine 134 to update the state of the LLM and based on the first segment that was selected at block 358 in the same or similar manner described above with respect to block 260 of the method 200 of FIG. 2. However, in contrast with the method 200 of FIG. 2, at block 360, the system also causes the first segment to be rendered at the client device. For example, the NL based output streaming engine 142 can cause the first segment to be transmitted to the client device to cause the first segment to be rendered at the client device in response to the first segment being selected for inclusion in the stream of NL based output. The first segment can be visually and/or audibly rendered at the client device in the same or similar manner described with respect to block 270 of the method 200 of FIG. 2, but only with respect to the first segment.

At block 362, the system processes, using the LLM and based on the updated state of the LLM, the NL based input to continue generating the stream of the LLM output. At block 364, the system determines, based on the stream of LLM output, a plurality of second candidate segments for a second segment of the stream of NL based output. At block 366, the system selects a given second candidate segment, from among the plurality of second candidate segments for the stream of NL based output, as the second segment of the stream of NL based output. The operations of blocks 362-366 of the method 300 of FIG. 3 can be performed in the same or similar manner described above with respect to blocks 262-266 of the method 200 of FIG. 2, respectively.

At block 368, the system causes: (1) the second segment to be rendered at the client device. For example, the NL based output streaming engine 142 can cause the second segment to be transmitted to the client device to cause the second segment to be rendered at the client device in response to the second segment being selected for inclusion in the stream of NL based output. The second segment can be visually and/or audibly rendered at the client device in the same or similar manner described with respect to block 270 of the method 200 of FIG. 2, but with respect to the second segment that follows the first segment in the stream of NL based output.

At block 370, the system determines whether to include an additional segment in the stream of NL based output. The system can determine whether to include an additional segment in the stream of NL in the same or similar manner described with respect to block 268 of the method 200 of FIG. 2.

If, at an iteration of block 370, the system determines to include an additional segment in the stream of NL based output, then the system proceeds to block 372. At block 372, the system causes: (2) an indication of the second segment to be provided to the LLM to further update the state of the LLM. Further, the system returns to block 362 and continued with the method 300, but with respect to both the first segment and the second segment that have already been selected for inclusion in the stream of NL based output and that the system has caused to be rendered at the client device. For example, at a subsequent iteration of block 362, the system can cause the LLM engine 131 to continue processing, using the LLM stored in the LLM(s) database 131A, the NL based input to generate the stream of LLM output and with respect to both the first segment was selected for inclusion in the stream of NL based output and the second segment that was selected for inclusion in the stream of NL based output. Further, at a subsequent iteration of block 364, the system can cause the candidate segment engine 132 to determine, based on a further updated probability distribution over the sequence of words or phrases (e.g., further updated based the operations of block 372), a plurality of third candidate segments for a third segment of the stream of NL based input. Moreover, at a subsequent iteration of block 366, the system can cause the segment selection engine 133 to select, based on one or more of the ranking criteria noted above, the third segment for inclusion in the stream of NL based output and from among the plurality of third candidate segments for the stream of NL based output. Furthermore, at a subsequent iteration of block 368, the system can cause the third segment to be rendered at the client device. The method can continue in this manner until it is determined to not include any additional segments in the stream of NL based output at a subsequent iteration of block 370.

If, at an iteration of block 370, the system determines not to include any additional segment in the stream of NL based output, then the system returns to block 352 to receive additional NL based input associated with the client device or an additional client device. This enables the system to perform an additional iteration of the method 300 of FIG. 3 with respect to the additional NL based input.

Although the operations of blocks 368 and 372 are depicted as separate operations, it should be understood that is for the sake of example and is not meant to be limiting and that the operations of blocks 368 and 372 can be combined. However, it should be understood that the system need not further update the state of the LLM based on the second segment if the system determines not to include any additional segment in the stream of NL based output. Accordingly, the operations of block 372 are depicted separately from the operations of block 368 as shown in the method 300 of FIG. 3.

As noted above, in implementations of the method 300, the stream of NL based output may be rendered at the client device as the the stream of NL based output is being generated and prior to the stream of NL based output being complete. However, in various implementations, one or more portions of the stream of NL based output that is initially generated may not be suitable for rendering at the client device due to assurance reasons, accuracy reasons, quality reasons, coherency reasons, and/or other reasons. For instance, the first segment can be rendered at the client device in response to the first segment being selected. However, none of the plurality of second candidate segments may be suitable for rendering along with the second segment. Accordingly, the system may need to select an alternative first segment, from the plurality of second segments and/or generate an additional stream of NL based output by processing the NL based input using an additional iteration of the method 300. In these implementations, and since the first segment may already be rendered at the client device, the system can cause the client device to halt rendering of the first segment and/or undo rendering of the first segment. Further, in these implementations, the system can undo rendering of the first segment in a streaming manner, such as on a character-by-character basis, a word-by-word basis, a segment-by-segment basis, and/or or in other streaming manners.

Turning now to FIG. 4, a flowchart illustrating yet another example method 400 of generating a stream of natural language (NL) based output on a segment-by-segment basis to reduce latency in causing the stream of NL based output to be rendered is depicted. For convenience, the operations of the method 400 are described with reference to a system that performs the operations. This system of the method 400 includes one or more processors, memory, and/or other component(s) of computing device(s) (e.g., client device 110 of FIGS. 1, 6A, and 6B, NL based output system 120 of FIG.

Figure 7:
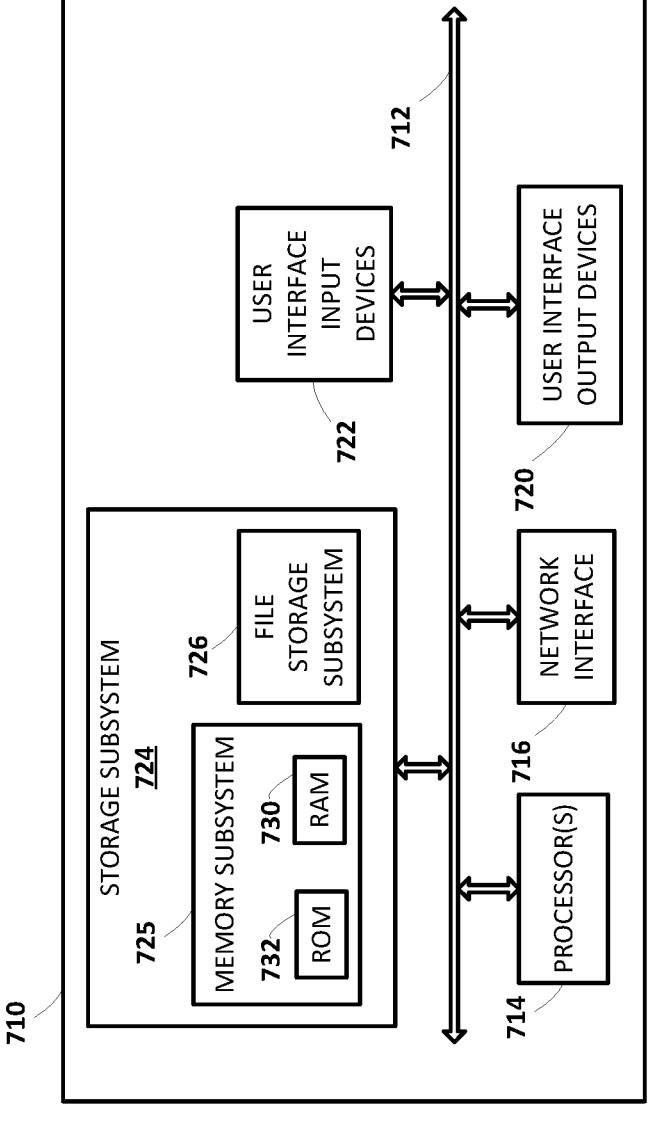
FIG. 7 depicts an example architecture of a computing device, in accordance with various implementations.

1, computing device 710 of FIG. 7, one or more servers, and/or other computing devices). Moreover, while operations of the method 400 are shown in a particular order, this is not meant to be limiting. One or more operations may be reordered, omitted, and/or added.

At block 452, the system receives NL based input associated with a client device. At block 454, the system processes, using a LLM, the NL based input to generate LLM output. At block 456, the system determines, based on the LLM output, a plurality of first candidate segments for a first segment of the stream of NL based output. At block 458, the system selects a given first candidate segment, from among the plurality of first candidate segments for the stream of NL based output, as the first segment of the stream of NL based output. The operations of blocks 452-458 of the method 400 of FIG. 4 can be performed in the same or similar manner described above with respect to blocks 252-258 of the method 200 of FIG. 2, respectively. However, in contrast with the method 200 of FIG. 2, the LLM output may not be considered a stream in that the probability distribution over the sequence of words or phrases that are predicted to be responsive to the NL based input is not continuously updated with respect any previously selected segments for a stream of NL based output.

Rather, at block 460, the system processes, using the LLM and based on the first segment, the NL based input to generate additional LLM output. The additional LLM output can include, for example, an additional probability distribution over the sequence of words or phrases that are predicted to be responsive to the NL based input. However, the additional probability distribution over the sequence of words or phrases that are predicted to be responsive to the NL based input is generated with respect to the first segment. For example, the system can cause the update engine 134 to augment the NL based input with the first segment that was selected for inclusion in the stream of NL based input. Further, the system can cause the LLM engine 131 to process, using the LLM stored in the LLM(s) database 131A, the augmented NL based output to generate the additional probability distribution over the sequence of words or phrases. By augmenting the NL based input, the system can cause the LLM engine 131 to not only process the NL based input that was provided by the user, but also the first segment that was selected for inclusion in the stream of NL based output as part of the NL based input or as a separate contextual signal. Accordingly, the LLM engine 131 can take the first segment into consideration in generating the additional probability distribution over the sequence of words or phrases. This enables the LLM to leverage the fact that the first segment was selected for inclusion in the stream of NL based output without having to explicitly update the state of the LLM as in the method 200 of FIG. 2 and the method 300 of FIG. 3.

At block 462, the system determines, based on the additional LLM output, a plurality of second candidate segments for a second segment of the stream of NL based output. At block 464, the system selects a given second candidate segment for the stream of NL based output as the second segment for the stream of NL based output. The operations of blocks 462 and 464 of the method 400 of FIG. 4 can be performed in the same or similar manner described above with respect to blocks 264 and 266 of the method 200 of FIG. 2, respectively, but with respect to the additional probability distribution.

At block 466, the system determines whether to include an additional segment in the stream of NL based output. The system can determine whether to include an additional segment in the stream of NL in the same or similar manner described with respect to block 268 of the method 200 of FIG. 2.

If, at an iteration of block 466, the system determines to include an additional segment in the stream of NL based output, then the system returns to block 460 and continues with the method 400, but with respect to both the first segment and the second segment that have already been selected for inclusion in the stream of NL based output. For example, at a subsequent iteration of block 460, the system can cause the LLM engine 131 to process, using the LLM stored in the LLM(s) database 131A, further augmented NL based input (e.g., that is augmented based on both the first segment and the second segment) to generate further additional LLM output and with respect to both the first segment was selected for inclusion in the stream of NL based output and the second segment that was selected for inclusion in the stream of NL based output. Further, at a subsequent iteration of block 462, the system can cause the candidate segment engine 132 to determine, based on the further additional probability distribution over the sequence of words or phrases, a plurality of third candidate segments for a third segment of the stream of NL based input. Moreover, at a subsequent iteration of block 464, the system can cause the segment selection engine 133 to select, based on one or more of the ranking criteria noted above, the third segment for inclusion in the stream of NL based output and from among the plurality of third candidate segments for the stream of NL based output. The method can continue in this manner until it is determined to not include any additional segments in the stream of NL based output at a subsequent iteration of block 466.

If, at an iteration of block 466, the system determines not to include any additional segment in the stream of NL based output, then the system proceeds to block 468. At block 468, the system causes the stream of NL based output that is responsive to the NL based input to be rendered at the client device. The system can cause the stream of NL based output that is responsive to the NL based input to be rendered at the client device in the same or similar manner described with respect to block 270 of the method 200 of FIG. 2.

Turning now to FIG. 5, a flowchart illustrating yet another example method 500 of generating a stream of natural language (NL) based output on a segment-by-segment basis to reduce latency in causing the stream of NL based output to be rendered is depicted. For convenience, the operations of the method 500 are described with reference to a system that performs the operations. This system of the method 500 includes one or more processors, memory, and/or other component(s) of computing device(s) (e.g., client device 110 of FIGS. 1, 6A, and 6B, NL based output system 120 of FIG. 1, computing device 710 of FIG. 7, one or more servers, and/or other computing devices). Moreover, while operations of the method 500 are shown in a particular order, this is not meant to be limiting. One or more operations may be reordered, omitted, and/or added.

At block 552, the system receives NL based input associated with a client device. At block 554, the system processes, using a LLM, the NL based input to generate LLM output. At block 556, the system determines, based on the LLM output, a plurality of first candidate segments for a first segment of the stream of NL based output. At block 558, the system selects a given first candidate segment, from among the plurality of first candidate segments for the stream of NL based output, as the first segment of the stream of NL based output. The operations of blocks 552-558 of the method 500 of FIG. 5 can be performed in the same or similar manner described above with respect to blocks 252-258 of the method 200 of FIG. 2, respectively. However, in contrast with the method 200 of FIG. 2 and similar to the method 400 of FIG. 4, the LLM output may not be considered a stream in that the probability distribution over the sequence of words or phrases that are predicted to be responsive to the NL based input is not continuously updated with respect any previously selected segments for a stream of NL based output.

At block 560, the system causes the first segment to be rendered at the client device. For example, the NL based output streaming engine 142 can cause the first segment to be transmitted to the client device to cause the first segment to be rendered at the client device in response to the first segment being selected for inclusion in the stream of NL based output. The first segment can be visually and/or audibly rendered at the client device in the same or similar manner described with respect to block 270 of the method 200 of FIG. 2, but only with respect to the first segment. This is in contrast with the method 400 of FIG. 4 where the first segment is withheld from rendering at the client device until the stream of NL based output is completed.

At block 562, the system processes, using the LLM and based on the first segment, the NL based input to generate additional LLM output. At block 564, the system determines, based on the additional LLM output, a plurality of second candidate segments for a second segment of the stream of NL based output. At block 566, the system selects a given second candidate segment, from among the plurality of second candidate segments for the stream of NL based output, as the second segment of the stream of NL based output. The operations of blocks 562-566 of the method 500 of FIG. 5 can be performed in the same or similar manner described above with respect to blocks 460-464 of the method 400 of FIG. 4, respectively.

At block 568, the system causes the second segment to be rendered at the client device. For example, the NL based output streaming engine 142 can cause the second segment to be transmitted to the client device to cause the second segment to be rendered at the client device in response to the second segment being selected for inclusion in the stream of NL based output. The second segment can be visually and/or audibly rendered at the client device in the same or similar manner described with respect to block 270 of the method 200 of FIG. 2, but with respect to the second segment that follows the first segment in the stream of NL based output.

At block 570, the system determines whether to include an additional segment in the stream of NL based output. The system can determine whether to include an additional segment in the stream of NL in the same or similar manner described with respect to block 268 of the method 200 of FIG. 2.

If, at an iteration of block 570, the system determines to include an additional segment in the stream of NL based output, then the system returns to block 562 and continues with the method 500, but with respect to both the first segment and the second segment that have already been selected for inclusion in the stream of NL based output and/or rendered at the client device. For example, at a subsequent iteration of block 562, the system can cause the LLM engine 131 to process, using the LLM stored in the LLM(s) database 131A, further augmented NL based input (e.g., that is augmented based on both the first segment and the second segment) to generate further additional LLM output and with respect to both the first segment was selected for inclusion in the stream of NL based output and the second segment that was selected for inclusion in the stream of NL based output. Further, at a subsequent iteration of block 564, the system can cause the candidate segment engine 132 to determine, based on the further additional probability distribution over the sequence of words or phrases, a plurality of third candidate segments for a third segment of the stream of NL based input. Moreover, at a subsequent iteration of block 566, the system can cause the segment selection engine 133 to select, based on one or more of the ranking criteria noted above, the third segment for inclusion in the stream of NL based output and from among the plurality of third candidate segments for the stream of NL based output. Furthermore, at a subsequent iteration of block 568, the system can cause the second segment to be rendered at the client device. The method can continue in this manner until it is determined to not include any additional segments in the stream of NL based output at a subsequent iteration of block 570.

If, at an iteration of block 570, the system determines not to include any additional segment in the stream of NL based output, then the system returns to block 552 to receive additional NL based input associated with the client device or an additional client device. This enables the system to perform an additional iteration of the method 500 of FIG. 5 with respect to the additional NL based input.

Figure 6A:
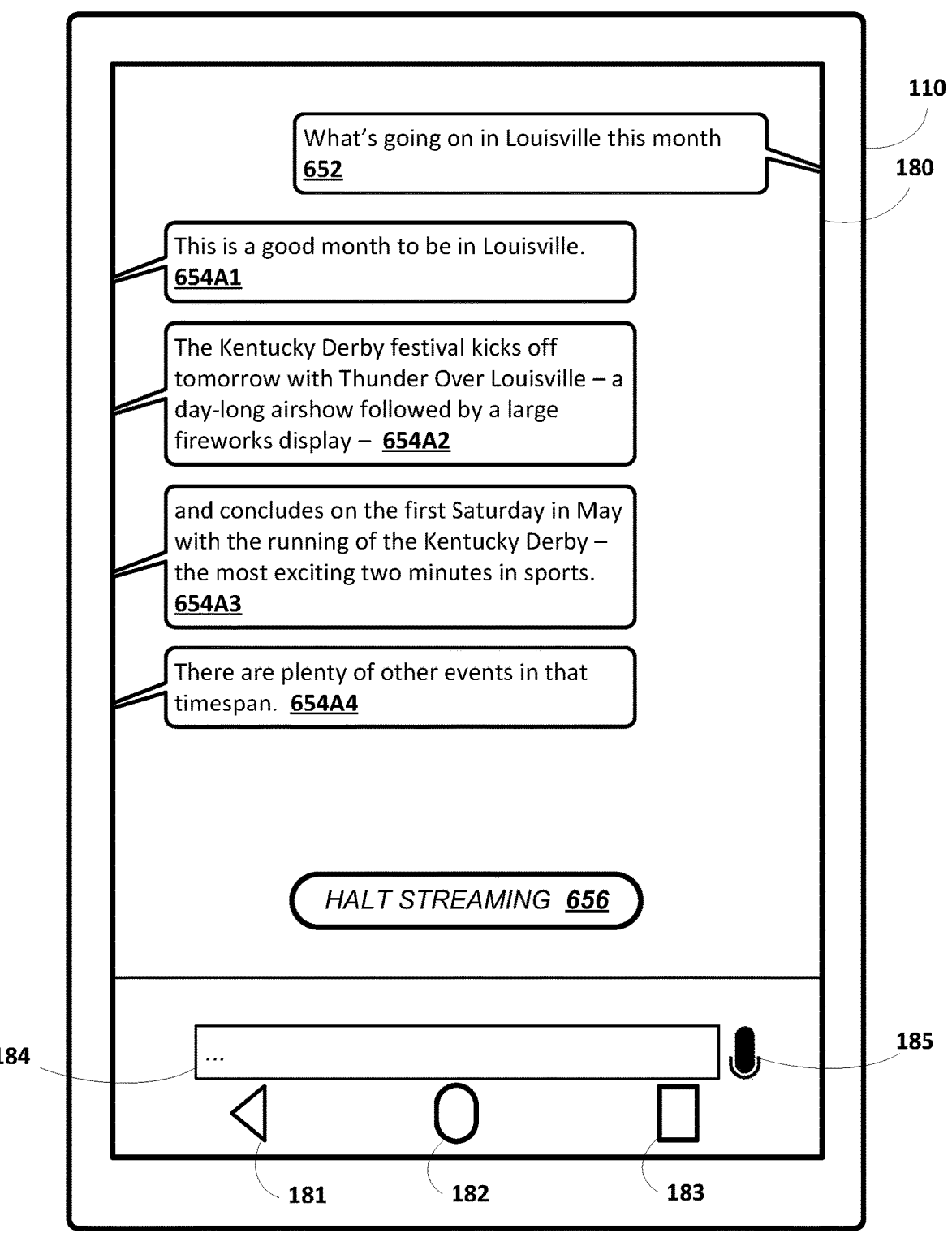
FIG. 6A and FIG. 6B depict various non-limiting examples of rendering natural language (NL) based output, in accordance with various implementations.
Figure 6B:
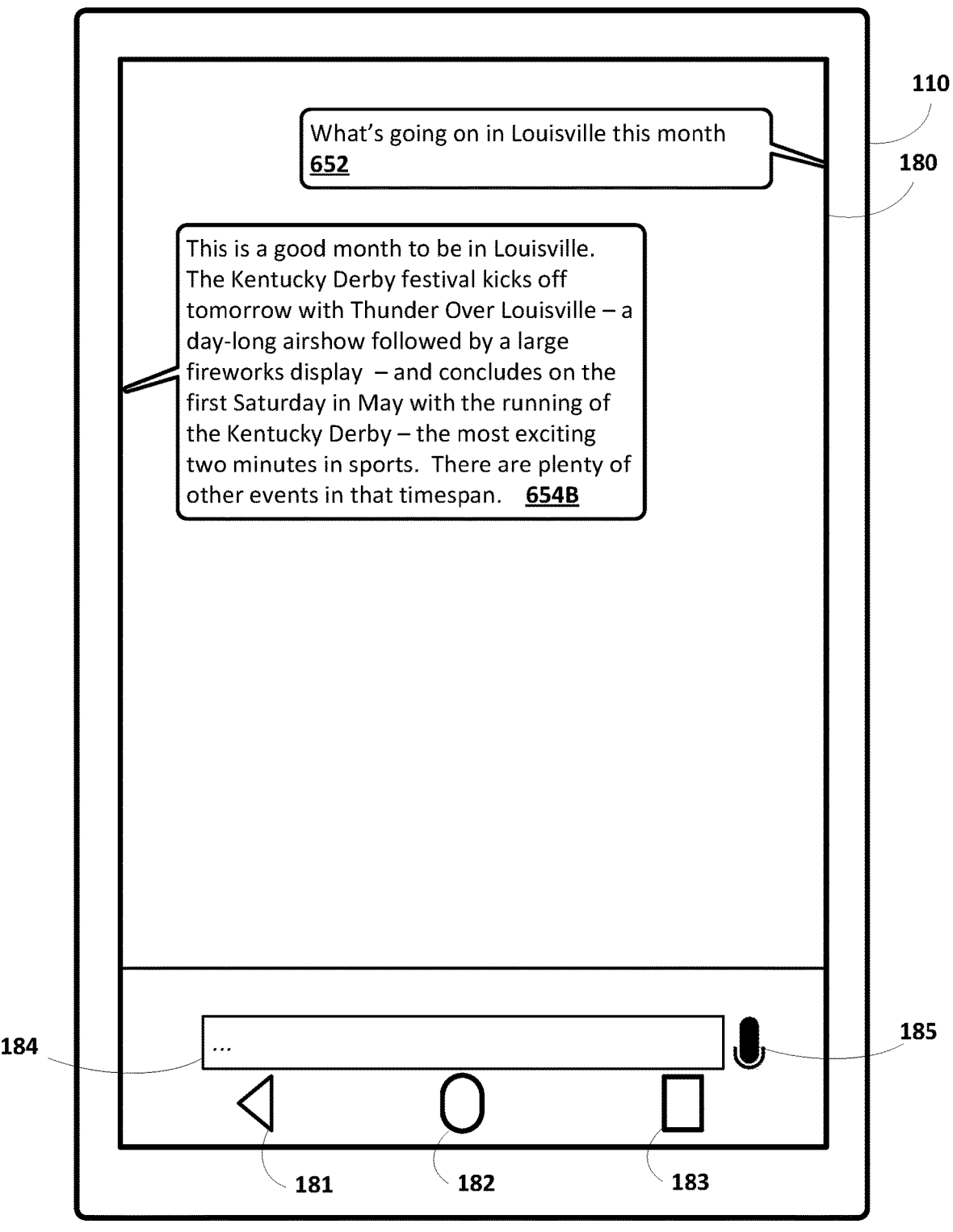

Turning now to FIGS. 6A and 6B, various non-limiting examples of a client device rendering a graphical interface that includes a respective modified NL based summary that is initially generated using a LLM and subsequently modified for attribution are depicted. The client device 110 (e.g., the client device 110 from FIG. 1) may include various user interface components including, for example, microphone(s) to generate audio data based on spoken utterances and/or other audible input, speaker(s) to audibly render synthesized speech and/or other audible output, and/or a display 180 to visually render visual output. Further, the display 180 of the client device 110 can include various system interface elements 181, 182, and 183 (e.g., hardware and/or software interface elements) that may be interacted with by a user of the client device 110 to cause the client device 110 to perform one or more actions. The display 180 of the client device 110 enables the user to interact with content rendered on the display 180 by touch input (e.g., by directing user input to the display 180 or portions thereof (e.g., to a text entry box 184, to a keyboard (not depicted), or to other portions of the display 180)) and/or by spoken input (e.g., by selecting microphone interface element 185—or just by speaking without necessarily selecting the microphone interface element 185 (i.e., an automated assistant may monitor for one or more terms or phrases, gesture(s) gaze(s), mouth movement(s), lip movement(s), and/or other conditions to activate spoken input) at the client device 110). Although the client device 110 depicted in FIGS. 6A and 6B is a mobile phone, it should be understood that is for the sake of example and is not meant to be limiting. For example, the client device 110 may be a standalone speaker with a display, a standalone speaker without a display, a home automation device, an in-vehicle system, a laptop, a desktop computer, and/or any other device capable of executing an automated assistant to engage in a human-to-computer dialog session with the user of the client device 110.

Referring specifically to FIG. 6A, assume that a user of the client device 110 directs NL based input 652 of "What's going on in Louisville this month" to an automated assistant executing at least in part at the client device 110. The NL based input 652 can be provided by the user, for example, by directing spoken input to the automated and/or by directing typed input to the automated assistant via a keyboard.

Although the example of FIG. 6A is described with respect to the NL based input 652 being directed to the automated assistant, it should be understood that is for the sake of example and is not meant to be limiting. For example, the NL based input 652 can be directed to any software application that is accessible at the client device 110 (e.g., via the application engine 115) capable of receiving the NL based input 652 and causing a stream of NL based output that is responsive to the NL based input 652 to be rendered at the client device 110, such as a web browser software application. Further, although the example of FIG. 6A is described with respect to the NL based input 652 being based on explicit input provided by the user of the client device 110, it should be understood that is also for the sake of example and is not meant to be limiting. For example, the NL based input 652 can be an implied NL based input (e.g., as described with respect to the implied input engine 114).

Further assume that the automated assistant, in generating a stream of NL based output that is responsive to the NL based input 652, implements the method 300 of FIG. 3 or the method 500 of FIG. 5 where the NL based output that that is responsive to the NL based input 652 is generated and rendered in a streaming manner. For instance, a first segment 654A1 of the stream of NL based output of "This is a good month to be in Louisville" can be generated and rendered at the client device 110; a second segment 654A2 of the stream of NL based output of "The Kentucky Derby festival kicks off tomorrow with Thunder Over Louisville—a day-ling airshow followed by a large fireworks display—" can be generated and rendered at the client device 110 and subsequent to the first segment 654A1; a third segment 654A3 of the stream of NL based output of "and concludes on the first Saturday in May with the running of the Kentucky Derby—the most exciting two minutes in sports." can be generated and rendered at the client device 110 and subsequent to the second segment 654A2; and a fourth segment 654A4 of the stream of NL based output of "There are plenty of other events in that timespan" can be generated and rendered at the client device 110 and subsequent to the third segment 654A3.

Notably, in this example, while the first segment 654A1 is being rendered at the client device 110, the second segment 654A2 may be in the process of being selected as described with respect to the method 300 of FIG. 3 or the method 500 of FIG. 5. Further, while the second segment 654A2 is being rendered at the client device 110, the third segment 654A3 may be in the process of being selected as described with respect to the method 300 of FIG. 3 or the method 500 of FIG. 5. Moreover, while the third segment 654A3 is being rendered at the client device 110, the fourth segment 654A4 may be in the process of being selected as described with respect to the method 300 of FIG. 3 or the method 500 of FIG. 5. Accordingly, in the example of FIG. 6A, not only are the segments that form the stream of NL based output generated in a streaming manner, but they are also rendered at the client device 110 in a streaming manner. By generating the stream of NL based output in this manner, latency in causing the stream of NL based output to be rendered can be reduced since the entire stream of NL based output need not be evaluated subsequent to the stream of NL based output being completed. Further, by rendering the stream of NL based output in this manner, latency in causing the stream of NL based output to be rendered can be reduced since the segments that form the stream of NL based output can be rendered prior to the stream of NL based output being completed.

In various implementations of the method 300 of FIG. 3 or the method 500 of FIG. 5 where the NL based output that that is responsive to the NL based input 652 is generated and rendered in a streaming manner, and while the stream of NL based output is being rendered at the client device 110, the client device 110 can cause a halt streaming selectable element 656 to be rendered via the display 180 of the client device 110. The halt streaming selectable element 656, when selected by the user of the client device 110 (e.g., via voice input and/or touch input), can cause the generating and/or rendering of the stream of NL based output to be halted. For example, assume that, as the second segment 654A2 is being rendered at the client device 110, the user of the client device 110 realizes that "Louisville" in the NL based input 652 was interpreted as being "Louisville, Kentucky" based on the second segment 654A2 referencing the "Kentucky Derby", but that the user intended "Louisville" in the NL based input 652 to be interpreted as "Louisville, Colorado". In this example, the user of the client device 110 can provide a user selection of the halt streaming selectable element 656 to cause rendering of the segment 654A2 to be halted and to cause generating and/or rendering of any of the subsequent segments (e.g., the third segment 654A3 and/or 654A4) to be halted. This enables the user to refine the NL based input 652 to, for example, "What's going on in Louisville, Colorado this month" and based on the second segment 654A2 referencing the "Kentucky Derby" (e.g., which is associated with "Louisville, Kentucky" and not "Louisville, Colorado" as the user intended). Accordingly, an additional stream of NL based output can be generated and rendered by processing the refined NL based input. By causing the halt streaming selectable element 656 to be rendered at the client device 110 while generating and/or rendering the stream of NL based output, the human-to-computer interaction is guided in a more quick and efficient manner. For instance, the stream of NL based output need not be completed prior to receiving the user selection of halt streaming selectable element 656, thereby conserving computational resources for the current human-to-computer interaction.

In contrast with the example of FIG. 6A, and referring specifically to FIG. 6B, further assume that the automated assistant, in generating the stream of NL based output that is responsive to the NL based input 652, implements the method 200 of FIG. 2 or the method 400 of FIG. 4 where the NL based output that that is responsive to the NL based input 652 is generated in a streaming manner, but is not rendered in a streaming manner. Put another way, each of the first segment 654A1, the second segment 654A2, the third segment 654A3, and the fourth segment 654A4 from FIG. 6A can be selected in a streaming manner where the selection of each subsequent segment is dependent on the previously selected segment. However, for the reasons noted with respect to the method 200 of FIG. 2, the stream of NL based output may be withheld from being rendered until the stream of NL based output is complete. Accordingly, in the example of FIG. 6B, the stream of NL based output may be generated to include the same content, but appear as a single NL based output 654B. Similarly, by generating the stream of NL based output in this manner, latency in causing the stream of NL based output to be rendered can be reduced since the entire stream of NL based output need not be evaluated subsequent to the stream of NL based output being completed.

Although each of the segments that form the stream of NL based output in the example of FIG. 6A are depicted as disparate segments, it should be understood that is for the sake of illustrating techniques described herein. For example, each of the segments that form the stream of NL based output in the example of FIG. 6A can be rendered to appear as a single NL based output like the single NL based output 654B in FIG. 6B. Further, although the stream of NL based output is depicted as being visually rendered, it should be understood that is also for the sake of illustrating techniques described herein. In additional or alternative examples, the stream of NL based output can be audibly rendered via speaker(s) of the client device 110 or an additional client device of the user of the client device 110. Moreover, although each of the segments that form the stream of NL based output in the example of FIG. 6A are depicted as being of particular lengths, it should be understood that is for the sake of example and is not meant to be limiting.

Turning now to FIG. 7, a block diagram of an example computing device 710 that may optionally be utilized to perform one or more aspects of techniques described herein is depicted. In some implementations, one or more of a client device, cloud-based automated assistant component(s) or other cloud-based software application component(s), and/or or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving natural language (NL) based input associated with a client device; and generating, based on processing the NL based input using a large language model (LLM), a stream of NL based output that is responsive to the NL based input. Generating the stream of NL based output that is responsive to the NL based input based on processing the NL based input using the LLM includes: processing, using the LLM, the NL based input to generate a stream of LLM output; determining, based on the stream of LLM output, a plurality of first candidate segments for a first segment of the stream of NL based output; selecting a given first candidate segment, from among the plurality of first candidate segments for the stream of NL based output, as the first segment of the stream of NL based output; in response to selecting the given first candidate segment as the first segment of the stream of NL based output, causing an indication of the first segment of the stream of NL based output to be provided to the LLM to update a state of the LLM; continue processing, using the LLM and based on the updated state of the LLM, the NL based input to continue generating the stream of LLM output; determining, based on the stream of LLM output, a plurality of second candidate segments for a second segment of the stream of NL based output, the second segment of the stream of NL based output following the first segment of the stream of NL based output; and selecting a given second candidate segment, from among the plurality of second candidate segments for the stream of NL based output, as the second segment of the stream of NL based output. The method further includes causing the stream of NL based output that is responsive to the NL based input to be rendered at the client device.

These and other implementations of technology disclosed herein can optionally include one or more of the following features.

In some implementations, the stream of LLM output can include a probability distribution over a sequence of words. In these implementations, determining the plurality of first candidate segments for the first segment of the stream of NL based output can include: determining, based on the probability distribution over the sequence of words, the plurality of first candidate segments for the first segment of the stream of NL based output.

In some versions of those implementations, selecting the given first candidate segment as the first segment of the stream of NL based output and from among the plurality of first candidate segments for the stream of NL based output can be based on one or more ranking criteria. In some further versions of those implementations, the one or more ranking criteria can include one or more of: an assurance criterion, an accuracy criterion, or a quality criterion.

In additional or alternative versions of those implementations, determining the plurality of second candidate segments for the second segment of the stream of NL based output can include, subsequent to selecting the first segment: determining, based on the probability distribution over the sequence of words and based on the first segment of the stream of NL based output, the plurality of second candidate segments for the second segment of the stream of NL based output. In some further versions of those implementations, selecting the given second candidate segment as the second segment of the stream of NL based output and from among the plurality of second candidate segments for the stream of NL based output can be based on one or more ranking criteria. In some yet further versions of those implementations, the one or more ranking criteria can include one or more of: an assurance criterion, an accuracy criterion, a quality criterion, or a coherency criterion.

In additional or alternative versions of those implementations, generating the stream of NL based output that is responsive to the NL based input based on processing the NL based input using the LLM further can include: in response to selecting the given second candidate segment as the second segment of the stream of NL based output, causing an additional indication of the second segment of the stream of NL based output to be provided to the LLM to further update the state of the LLM; continue processing, using the LLM and based on the further updated state of the LLM, the NL based input to continue generating the stream of LLM output; determining, based on the stream of LLM output, a plurality of third candidate segments for a third segment of the stream of NL based output, the third segment of the stream of NL based output following the second segment of the stream of NL based output; and selecting a given third candidate segment, from among the plurality of third candidate segments for the stream of NL based output, as the third segment of the stream of NL based output. In some further versions of those implementations, determining the plurality of third candidate segments for the third segment of the stream of NL based output can include, subsequent to selecting the second segment: determining, based on the probability distribution over the sequence of words and based on the first segment of the stream of NL based output and based on the second segment of the stream of NL based output, the plurality of third candidate segments for the third segment of the stream of NL based output. In some yet further versions of those implementations, selecting the given third candidate segment as the third segment of the stream of NL based output and from among the plurality of third candidate segments for the stream of NL based output can be based on one or more ranking criteria.

In some implementations, the given first candidate segment can be pre-fetched by the client device in response to the given first candidate segment being selected as the first segment of the stream of NL based output, and the given first candidate segment can be pre-fetched by the client device prior to the given second candidate segment being selected as the second segment of the stream of NL based output.

In some implementations, the stream of NL based output that is responsive to the NL based input to be rendered at the client device can include: causing the first segment of the stream of NL based output to be visually rendered for presentation to a user of the client device via a display of the client device; and subsequent to causing the first segment of the stream of NL based output to be visually rendered for presentation to the user, causing the second segment of the stream of NL based output to be visually rendered for presentation to the user via the display of the client device.

In some implementations, the stream of LLM output can include a probability distribution over a sequence of words, and updating the state of the LLM can include utilizing the first segment of the stream of NL based output that was selected from among the plurality of first candidate segments as a prefix in determining the plurality of second candidate segments for the second segment of the stream of NL based output.

In some implementations, a method implemented by one or more processors is provided, and includes receiving natural language (NL) based input associated with a client device; and generating, based on processing the NL based input using a large language model (LLM), a stream of NL based output that is responsive to the NL based input and that is to be rendered at the client device in a streaming manner. Generating the stream of NL based output that is responsive to the NL based input and that is to be rendered at the client device in the streaming manner based on processing the NL based input using the LLM includes processing, using the LLM, the NL based input to generate a stream of LLM output; determining, based on the stream of LLM output, a plurality of first candidate segments for a first segment of the stream of NL based output; selecting a given first candidate segment, from among the plurality of first candidate segments for the stream of NL based output, as the first segment of the stream of NL based output; and in response to selecting the given first candidate segment as the first segment of the stream of NL based output: causing the first segment of the stream of NL based output to be rendered at the client device in the streaming manner; and causing an indication of the first segment of the stream of NL based output to be provided to the LLM to update a state of the LLM. Generating the stream of NL based output that is responsive to the NL based input and that is to be rendered at the client device in the streaming manner based on processing the NL based input using the LLM further includes continue processing, using the LLM and based on the updated state of the LLM, the NL based input to continue generating the stream of LLM output; determining, based on the stream of LLM output, a plurality of second candidate segments for a second segment of the stream of NL based output, the second segment of the stream of NL based output following the first segment of the stream of NL based output; selecting a given second candidate segment, from among the plurality of second candidate segments for the stream of NL based output, as the second segment of the stream of NL based output; and in response to selecting the given second candidate segment as the second segment of the stream of NL based output: causing the second segment of the stream of NL based output to be rendered at the client device in the streaming manner and subsequent to the first segment of the stream of NL based output.

These and other implementations of technology disclosed herein can optionally include one or more of the following features.

In some implementations, generating the stream of NL based output that is responsive to the NL based input based on processing the NL based input using the LLM further includes: in response to selecting the given second candidate segment as the second segment of the stream of NL based output: causing an additional indication of the second segment of the stream of NL based output to be provided to the LLM to further update the state of the LLM; continue processing, using the LLM and based on the further updated state of the LLM, the NL based input to continue generating the stream of LLM output; determining, based on the stream of LLM output, a plurality of third candidate segments for a third segment of the stream of NL based output, the third segment of the stream of NL based output following the second segment of the stream of NL based output; selecting a given third candidate segment, from among the plurality of third candidate segments for the stream of NL based output, as the third segment of the stream of NL based output; and in response to selecting the given second candidate segment as the second segment of the stream of NL based output: causing the third segment of the stream of NL based output to be rendered at the client device in the streaming manner and subsequent to the second segment of the stream of NL based output.

In some further versions of those implementations, the method further includes, while the first segment of the stream of NL based output is being rendered at the client device in the streaming manner and/or while the second segment of the stream of NL based output is being rendered at the client device in the streaming manner: causing a halt streaming selectable element to be rendered at the client device, wherein the halt streaming selectable element, when selected, causes the one or more processors to halt processing of the NL based input and/or halt rendering of a current segment of the stream of NL based output that is being rendered when the halt streaming selectable element is selected.

In some yet further versions of those implementations, the method can further include receiving, from a user of the client device, a user selection of the halt streaming selectable element; and causing the one or more processors to halt processing of the NL based input and/or halt rendering of a current segment of the stream of NL based output that is being rendered when the halt streaming selectable element is selected, wherein the current segment of the stream of NL based output is one of: the first segment of the stream of NL based output or the second segment of the stream of NL based output.

In some yet further versions of those implementations, the method can further include receiving refined NL based input associated with the client device, wherein the refined NL based input is a refinement of the NL based input, and wherein the refinement of the NL based input is based on one of: the first segment of the stream of NL based output or the second segment of the stream of NL based output.

In some implementations, a method implemented by one or more processors is provided, and includes receiving natural language (NL) based input associated with a client device; and generating, based on processing the NL based input using a large language model (LLM), a stream of NL based output that is responsive to the NL based input. Generating the stream of NL based output that is responsive to the NL based input based on processing the NL based input using the LLM includes: processing, using the LLM, the NL based input to generate LLM output; determining, based on the LLM output, a plurality of first candidate segments for a first segment of the stream of NL based output; selecting a given first candidate segment, from among the plurality of first candidate segments for the stream of NL based output, as the first segment of the stream of NL based output; processing, using the LLM and based on the first segment, the NL based input to generate additional LLM output; determining, based on the additional LLM output, a plurality of second candidate segments for a second segment of the stream of NL based output, the second segment of the stream of NL based output following the first segment of the stream of NL based output; and selecting a given second candidate segment, from among the plurality of second candidate segments for the stream of NL based output, as the second segment of the stream of NL based output. The method further includes causing the stream of NL based output that is responsive to the NL based input to be rendered at the client device.

These and other implementations of technology disclosed herein can optionally include one or more of the following features.

In some implementations, the LLM output can include a probability distribution over a sequence of words, and determining the plurality of first candidate segments for the first segment of the stream of NL based output can include determining, based on the probability distribution over the sequence of words, the plurality of first candidate segments for the first segment of the stream of NL based output.

In some further versions of those implementations, selecting the given first candidate segment as the first segment of the stream of NL based output and from among the plurality of first candidate segments for the stream of NL based output can be based on one or more ranking criteria. In some yet further versions of those implementations, the one or more ranking criteria can include one or more of: an assurance criterion, an accuracy criterion, or a quality criterion.

In additional or alternative further versions of those implementations, the additional LLM output can include an additional probability distribution over the sequence of words, and determining the plurality of second candidate segments for the second segment of the stream of NL based output can include: determining, based on the additional probability distribution over the sequence of words and based on the first segment of the stream of NL based output, the plurality of second candidate segments for the second segment of the stream of NL based output. In some yet further versions of those implementations selecting the given second candidate segment as the second segment of the stream of NL based output and from among the plurality of second candidate segments for the stream of NL based output can be based on one or more ranking criteria. In some even yet further versions of those implementations, the one or more ranking criteria can include one or more of: an assurance criterion, an accuracy criterion, a quality criterion, or a coherency criterion.

In some implementations, generating the stream of NL based output that is responsive to the NL based input based on processing the NL based input using the LLM can further include: processing, using the LLM and based on the second segment, the NL based input to generate further additional LLM output; determining, based on the further additional LLM output, a plurality of third candidate segments for a third segment of the stream of NL based output, the third segment of the stream of NL based output following the second segment of the stream of NL based output; and selecting a given third candidate segment, from among the plurality of third candidate segments for the stream of NL based output, as the third segment of the stream of NL based output.

In some further versions of those implementations, the further additional LLM output can include a further additional probability distribution over the sequence of words, and determining the plurality of third candidate segments for the third segment of the stream of NL based output can include: determining, based on the further additional probability distribution over the sequence of words and based on the first segment of the stream of NL based output and based on the second segment of the stream of NL based output, the plurality of third candidate segments for the third segment of the stream of NL based output.

In some yet further versions of those implementations, selecting the given third candidate segment as the third segment of the stream of NL based output and from among the plurality of third candidate segments for the stream of NL based output can be based on one or more ranking criteria.

In some implementations, processing the NL based input to generate the additional LLM output can include augmenting the NL based input with the first segment to generate an augmented NL based input; and processing, using the LLM, the augmented NL based input to generate the additional LLM output.

In some implementations, a method implemented by one or more processors is provided, and includes receiving natural language (NL) based input associated with a client device; and generating, based on processing the NL based input using a large language model (LLM), a stream of NL based output that is responsive to the NL based input and that is to be rendered at the client device in a streaming manner. Generating the stream of NL based output that is responsive to the NL based input and that is to be rendered at the client device in the streaming manner based on processing the NL based input using the LLM can include processing, using the LLM, the NL based input to generate LLM output; determining, based on the LLM output, a plurality of first candidate segments for a first segment of the stream of NL based output; selecting a given first candidate segment, from among the plurality of first candidate segments for the stream of NL based output, as the first segment of the stream of NL based output; and in response to selecting the given first candidate segment as the first segment of the stream of NL based output, causing the first segment of the stream of NL based output to be rendered at the client device in the streaming manner; processing, using the LLM and based on the first segment, the NL based input to generate additional LLM output; determining, based on the additional LLM output, a plurality of second candidate segments for a second segment of the stream of NL based output, the second segment of the stream of NL based output following the first segment of the stream of NL based output; selecting a given second candidate segment, from among the plurality of second candidate segments for the stream of NL based output, as the second segment of the stream of NL based output; and in response to selecting the given second candidate segment as the second segment of the stream of NL based output, causing the second segment of the stream of NL based output to be rendered at the client device in the streaming manner and subsequent to the first segment of the stream of NL based output.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory and/or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving natural language (NL) based input associated with a client device;

generating, based on processing the NL based input using a large language model (LLM), a stream of NL based output that is responsive to the NL based input, wherein generating the stream of NL based output that is responsive to the NL based input based on processing the NL based input using the LLM comprises:

processing, using the LLM, the NL based input to generate a stream of LLM output;

determining, based on the stream of LLM output, a plurality of first candidate segments for a first segment of the stream of NL based output;

selecting a given first candidate segment, from among the plurality of first candidate segments for the stream of NL based output, as the first segment of the stream of NL based output;

in response to selecting the given first candidate segment as the first segment of the stream of NL based output, causing an indication of the first segment of the stream of NL based output to be provided to the LLM to update a state of the LLM;

continue processing, using the LLM and based on the updated state of the LLM, the NL based input to continue generating the stream of LLM output prior to completion of processing of the NL based input;

determining, based on the stream of LLM output, a plurality of second candidate segments for a second segment of the stream of NL based output, the second segment of the stream of NL based output following the first segment of the stream of NL based output; and selecting a given second candidate segment, from among the plurality of second candidate segments for the stream of NL based output, as the second segment of the stream of NL based output; and causing the stream of NL based output that is responsive to the NL based input to be rendered at the client device, wherein the given first candidate segment is pre-fetched and rendered by the client device in response to the given first candidate segment being selected as the first segment of the stream of NL based output, wherein the given first candidate segment is pre-fetched by the client device prior to the given second candidate segment being selected as the second segment of the stream of NL based output, and wherein the given second candidate segment is pre-fetched and rendered by the client device in response to the given second candidate segment being selected as the second segment of the stream of NL based output.

2. The method of claim 1, wherein the stream of LLM output comprises a probability distribution over a sequence of words, and wherein determining the plurality of first candidate segments for the first segment of the stream of NL based output comprises:

determining, based on the probability distribution over the sequence of words, the plurality of first candidate segments for the first segment of the stream of NL based output.

3. The method of claim 2, wherein selecting the given first candidate segment as the first segment of the stream of NL based output and from among the plurality of first candidate segments for the stream of NL based output is based on one or more ranking criteria.

4. The method of claim 3, wherein the one or more ranking criteria comprise one or more of: an assurance criterion, an accuracy criterion, or a quality criterion.

5. The method of claim 2, wherein determining the plurality of second candidate segments for the second segment of the stream of NL based output comprises:

subsequent to selecting the first segment:

determining, based on the probability distribution over the sequence of words and based on the first segment of the stream of NL based output, the plurality of second candidate segments for the second segment of the stream of NL based output.

6. The method of claim 5, wherein selecting the given second candidate segment as the second segment of the stream of NL based output and from among the plurality of second candidate segments for the stream of NL based output is based on one or more ranking criteria.

7. The method of claim 6, wherein the one or more ranking criteria comprise one or more of: an assurance criterion, an accuracy criterion, a quality criterion, or a coherency criterion.

8. The method of claim 2, wherein generating the stream of NL based output that is responsive to the NL based input based on processing the NL based input using the LLM further comprises:

in response to selecting the given second candidate segment as the second segment of the stream of NL based output, causing an additional indication of the second segment of the stream of NL based output to be provided to the LLM to further update the state of the LLM;

continue processing, using the LLM and based on the further updated state of the LLM, the NL based input to continue generating the stream of LLM output;

determining, based on the stream of LLM output, a plurality of third candidate segments for a third segment of the stream of NL based output, the third segment of the stream of NL based output following the second segment of the stream of NL based output; and selecting a given third candidate segment, from among the plurality of third candidate segments for the stream of NL based output, as the third segment of the stream of NL based output.

9. The method of claim 8, wherein determining the plurality of third candidate segments for the third segment of the stream of NL based output comprises:

subsequent to selecting the second segment:

determining, based on the probability distribution over the sequence of words and based on the first segment of the stream of NL based output and based on the second segment of the stream of NL based output, the plurality of third candidate segments for the third segment of the stream of NL based output.

10. The method of claim 9, wherein selecting the given third candidate segment as the third segment of the stream of NL based output and from among the plurality of third candidate segments for the stream of NL based output is based on one or more ranking criteria.

11. The method of claim 1, wherein the stream of NL based output that is responsive to the NL based input to be rendered at the client device comprises:

causing the first segment of the stream of NL based output to be visually rendered for presentation to a user of the client device via a display of the client device; and subsequent to causing the first segment of the stream of NL based output to be visually rendered for presentation to the user, causing the second segment of the stream of NL based output to be visually rendered for presentation to the user via the display of the client device.

12. The method of claim 1, wherein the stream of LLM output comprises a probability distribution over a sequence of words, and wherein updating the state of the LLM comprises:

utilizing the first segment of the stream of NL based output that was selected from among the plurality of first candidate segments as a prefix in determining the plurality of second candidate segments for the second segment of the stream of NL based output.

13. A method implemented by one or more processors, the method comprising:

receiving natural language (NL) based input associated with a client device; and generating, based on processing the NL based input using a large language model (LLM), a stream of NL based output that is responsive to the NL based input and that is to be rendered at the client device in a streaming manner, wherein generating the stream of NL based output that is responsive to the NL based input and that is to be rendered at the client device in the streaming manner based on processing the NL based input using the LLM comprises:

processing, using the LLM, the NL based input to generate a stream of LLM output;

determining, based on the stream of LLM output, a plurality of first candidate segments for a first segment of the stream of NL based output;

selecting a given first candidate segment, from among the plurality of first candidate segments for the stream of NL based output, as the first segment of the stream of NL based output; and in response to selecting the given first candidate segment as the first segment of the stream of NL based output and prior to completion of processing of the NL based input:

causing the first segment of the stream of NL based output to be rendered at the client device in the streaming manner; and causing an indication of the first segment of the stream of NL based output to be provided to the LLM to update a state of the LLM; and continue processing, using the LLM and based on the updated state of the LLM, the NL based input to continue generating the stream of LLM output prior to completion of processing of the NL based input;

determining, based on the stream of LLM output, a plurality of second candidate segments for a second segment of the stream of NL based output, the second segment of the stream of NL based output following the first segment of the stream of NL based output;

selecting a given second candidate segment, from among the plurality of second candidate segments for the stream of NL based output, as the second segment of the stream of NL based output; and in response to selecting the given second candidate segment as the second segment of the stream of NL based output:

causing the second segment of the stream of NL based output to be rendered at the client device in the streaming manner and subsequent to the first segment of the stream of NL based output.

14. The method of claim 13, wherein generating the stream of NL based output that is responsive to the NL based input based on processing the NL based input using the LLM further comprises:

in response to selecting the given second candidate segment as the second segment of the stream of NL based output:

causing an additional indication of the second segment of the stream of NL based output to be provided to the LLM to further update the state of the LLM;

continue processing, using the LLM and based on the further updated state of the LLM, the NL based input to continue generating the stream of LLM output;

determining, based on the stream of LLM output, a plurality of third candidate segments for a third segment of the stream of NL based output, the third segment of the stream of NL based output following the second segment of the stream of NL based output;

selecting a given third candidate segment, from among the plurality of third candidate segments for the stream of NL based output, as the third segment of the stream of NL based output; and in response to selecting the given third candidate segment as the third segment of the stream of NL based output:

causing the third segment of the stream of NL based output to be rendered at the client device in the streaming manner and subsequent to the second segment of the stream of NL based output.

15. The method of claim 14, further comprising:

while the first segment of the stream of NL based output is being rendered at the client device in the streaming manner and/or while the second segment of the stream of NL based output is being rendered at the client device in the streaming manner:

causing a halt streaming selectable element to be rendered at the client device, wherein the halt streaming selectable element, when selected, causes the one or more processors to halt processing of the NL based input and/or halt rendering of a current segment of the stream of NL based output that is being rendered when the halt streaming selectable element is selected.

16. The method of claim 15, further comprising:

receiving, from a user of the client device, a user selection of the halt streaming selectable element; and causing the one or more processors to halt processing of the NL based input and/or halt rendering of a current segment of the stream of NL based output that is being rendered when the halt streaming selectable element is selected, wherein the current segment of the stream of NL based output is one of: the first segment of the stream of NL based output or the second segment of the stream of NL based output.

17. The method of claim 16, further comprising:

receiving refined NL based input associated with the client device, wherein the refined NL based input is a refinement of the NL based input, and wherein the refinement of the NL based input is based on one of: the first segment of the stream of NL based output or the second segment of the stream of NL based output.

18. A system comprising:

at least one processor; and memory storing instructions that, when executed, cause the at least one processor to be operable to:

receive natural language (NL) based input associated with a client device; and generate, based on processing the NL based input using a large language model (LLM), a stream of NL based output that is responsive to the NL based input and that is to be rendered at the client device in a streaming manner, wherein the instructions to generate the stream of NL based output that is responsive to the NL based input and that is to be rendered at the client device in the streaming manner based on processing the NL based input using the LLM comprise instructions to:

process, using the LLM, the NL based input to generate a stream of LLM output;

determine, based on the stream of LLM output, a plurality of first candidate segments for a first segment of the stream of NL based output;

select a given first candidate segment, from among the plurality of first candidate segments for the stream of NL based output, as the first segment of the stream of NL based output; and in response to selecting the given first candidate segment as the first segment of the stream of NL based output and prior to completion of processing of the NL based input:

cause the first segment of the stream of NL based output to be rendered at the client device in the streaming manner; and cause an indication of the first segment of the stream of NL based output to be provided to the LLM to update a state of the LLM; and continue to process, using the LLM and based on the updated state of the LLM, the NL based input to continue generating the stream of LLM output prior to completion of processing of the NL based input;

determine, based on the stream of LLM output, a plurality of second candidate segments for a second segment of the stream of NL based output, the second segment of the stream of NL based output following the first segment of the stream of NL based output;

select a given second candidate segment, from among the plurality of second candidate segments for the stream of NL based output, as the second segment of the stream of NL based output; and in response to selecting the given second candidate segment as the second segment of the stream of NL based output:

cause the second segment of the stream of NL based output to be rendered at the client device in the streaming manner and subsequent to the first segment of the stream of NL based output.

\* \* \* \* \*